(12) United States Patent
Cannarella

(10) Patent No.: US 8,232,661 B2
(45) Date of Patent: Jul. 31, 2012

(54) SYSTEM AND METHOD FOR GENERATING AND STORING CLEAN ENERGY

(76) Inventor: Richard Thomas Cannarella, North Plainfield, NJ (US)

( * ) Notice: Subject to any disclaimer, the term of this patent is extended or adjusted under 35 U.S.C. 154(b) by 0 days.

(21) Appl. No.: 13/118,417

(22) Filed: May 28, 2011

(65) Prior Publication Data

US 2011/0227345 A1    Sep. 22, 2011

Related U.S. Application Data

(60) Provisional application No. 61/349,253, filed on May 28, 2010, provisional application No. 61/423,216, filed on Dec. 15, 2010.

(51) Int. Cl.
*F02B 63/04* (2006.01)
(52) U.S. Cl. ...................................................... 290/1 R
(58) Field of Classification Search .................... 290/1 R
See application file for complete search history.

(56) References Cited

U.S. PATENT DOCUMENTS

| | | | |
|---|---|---|---|
| 159,660 A | 2/1875 | Faivre | |
| 4,239,974 A | 12/1980 | Swander et al. | |
| 4,239,975 A | 12/1980 | Chiappetti | |
| 4,339,920 A | 7/1982 | Le Van | |
| 4,409,489 A | 10/1983 | Hayes | |
| 4,614,875 A | 9/1986 | McGee | |
| 4,739,179 A | 4/1988 | Stites | |
| 4,912,995 A | 4/1990 | Otters | |
| 5,355,674 A * | 10/1994 | Rosenberg | 60/325 |
| 6,172,426 B1 | 1/2001 | Galich | |
| 6,376,925 B1 * | 4/2002 | Galich | 290/1 R |
| 6,936,932 B2 | 8/2005 | Kenney | |
| 7,005,757 B2 * | 2/2006 | Pandian | 290/1 R |
| 7,102,244 B2 | 9/2006 | Hunter, Jr. | |
| 7,239,031 B2 * | 7/2007 | Ricketts | 290/1 R |
| 7,432,607 B2 | 10/2008 | Kim et al. | |
| 7,589,428 B2 | 9/2009 | Ghassemi | |
| 7,629,698 B2 * | 12/2009 | Horianopoulos et al. | 290/1 R |
| 2008/0157537 A1 | 7/2008 | Richard | |
| 2008/0224477 A1 * | 9/2008 | Kenney | 290/1 R |
| 2010/0072758 A1 * | 3/2010 | Chang et al. | 290/1 R |

* cited by examiner

*Primary Examiner* — Tho D Ta
(74) *Attorney, Agent, or Firm* — Lowry Blixseth LLP; Scott M. Lowry

(57) ABSTRACT

The system for generating and storing clean energy includes a flexible body externally exposed to an intermittent localized pressure. A pair of one-way check valves couple to the flexible body. A first valve is configured to facilitate unidirectional fluid flow into the flexible body and a second valve configured to facilitate unidirectional fluid flow out from the flexible body. A substantially rigid and planar base is positioned between the flexible body and the intermittent localized pressure so that pressure point peristaltic expansion and compression cycles along a portion of the flexible body cause positive fluid displacement into and out from the flexible body. An energy generation system in fluid communication with the flexible body is configured to generate electrical energy from pressurized fluid resultant from the peristaltic expansion and compression cycles.

16 Claims, 18 Drawing Sheets

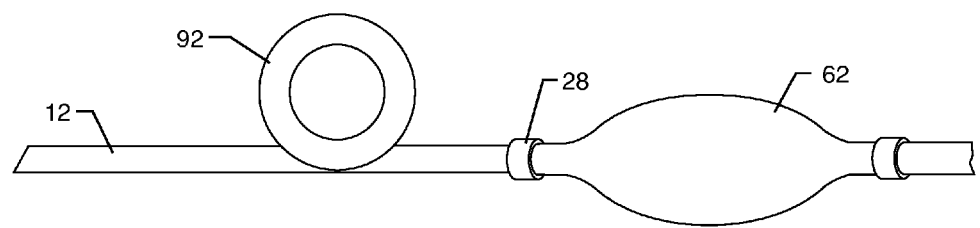
FIG. 11
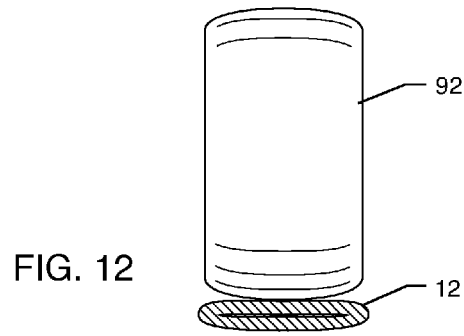
FIG. 12
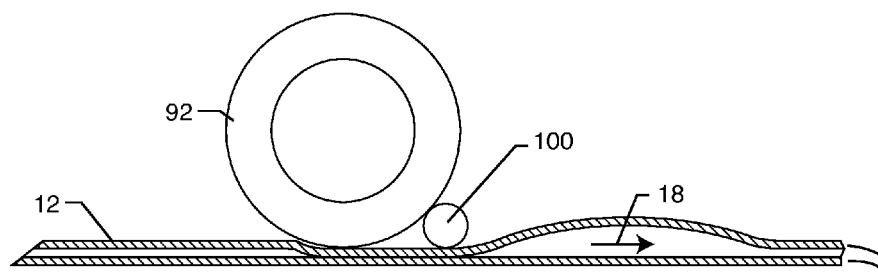
FIG. 13
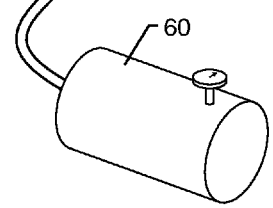

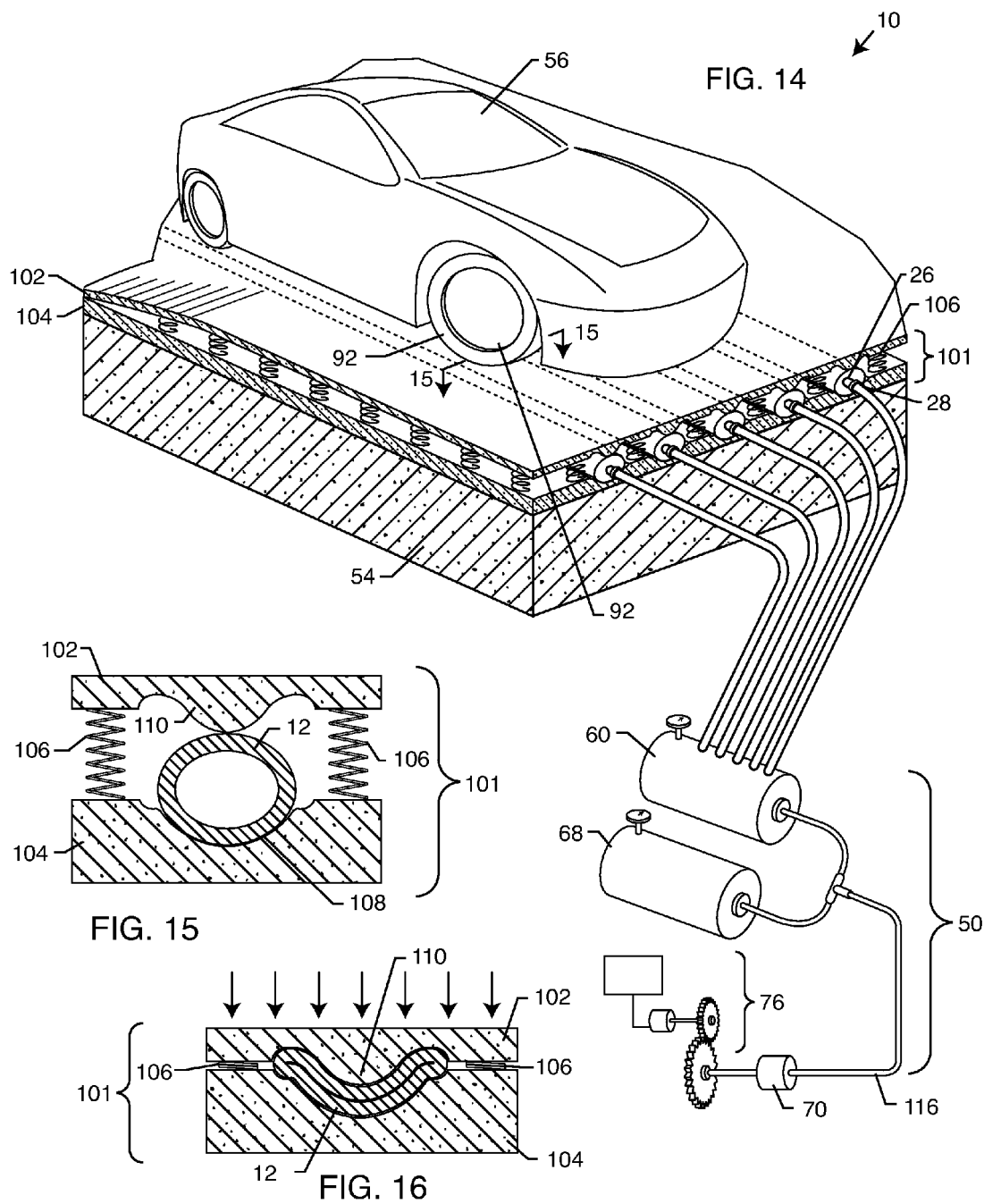

SYSTEM AND METHOD FOR GENERATING AND STORING CLEAN ENERGY

BACKGROUND OF THE INVENTION

The present invention relates to a system and method for generating and storing energy. More particularly, the invention relates to a system and method of generating and storing electrical energy with a fluid-based or mechanical load-based energy generation system by pressurizing a fluid in response to a load or point pressure, wherein the fluid is used to turn an alternator or mechanically rotate or replicate an alternator.

Green energy is energy that can be generated, extracted and/or consumed without having a significant impact on the environment. Sustainable or renewable energy sources that provide a means for harnessing such "green energy" include hydroelectricity, solar energy, wind energy, wave power, geothermal energy, bio-energy (biogas and biomass), and tidal power. Technologies that harness energy from these naturally occurring energy sources are in constant demand, especially in view of the ever increasingly depleted fossil fuel supplies and the threat of global warming. Importantly, the pollution generated through efforts to harness green energy is minimal relative to other energy sources (e.g. coal, oil, natural gas, etc.) widely popularized today. Thus, there has been an increasing demand for technologies that efficiently harness such renewable energy sources and efficiently deliver electricity to local power grids at manageable costs. As such, technologies that generate energy from these power sources should generate a constant supply of energy with the highest environmental benefit.

Some of the first "green" technologies included hydropower (e.g. the Hoover Dam), biomass combustion (e.g. energy generated from living organisms), geothermal power and heat energy. Second-generation technologies included solar heating and cooling, wind power (e.g. wind turbines), more modern forms of bio-energy, and solar photovoltaics. The need for renewable energy sources started to gain attention back in the 1970's during the oil crises of 1973 and 1979. Today, continued interest in renewable energy is due, at least in part, to the environmental benefits that cannot be obtained by burning fossil fuels. More advanced, third-generation technologies are still under research and development and include advanced biomass gasification, bio-refinery technologies, concentrating solar thermal power, hot dry rock geothermal energy, and ocean energy. The continued depletion of Earth's natural resources and other non-renewable energy only increases the demand for such green energy. Some of the more popular renewable energy sources under heavy development today include wind power, battery electric vehicles (BEV), solar power, geothermal power, tidal power, photovoltaics, wave power, nuclear energy, and other related bio-fuels.

Some communities have developed arrangements with electrical companies that give consumers the choice to purchase green electricity. Electrical companies that are currently unable to produce green energy must invest in technologies to meet consumer demand. Increasing the demand results in research and development projects that result in new and more efficient green technologies. At present, green energy currently only provides a small amount of electricity to consumers—generally in the range of 2% to 5%. Some states in the United States have formed power purchasing pools that enable consumers to buy renewable energy or a mix of renewable and consumer energy. If electrical companies have insufficient green energy sources available to meet the demand, the utility company must develop new or more efficient green technologies.

One problem with green energy development in the United States is an infrastructure that is largely built on a centralized consumer electricity supply that feeds from major power sources such as coal or nuclear power plants. A single plant may supply energy to hundreds of thousands of consumers. A system that is not designed to efficiently carry such energy can result in higher infrastructural costs, decreased efficiency in delivery and increased carbon emissions and other quality problems, in order to meet demand. One particular drawback of the inherent characteristics of harnessing renewable energy resources is that the land where the energy can be harnessed is often located in remote areas where the energy demand is relatively low. This may be especially so for wind farms and solar panel fields. One problem, for example, is channeling the energy from the remote area, through the current infrastructure, to areas of high demand. Preferably, the renewable energy generation systems are deployed to capture and distribute energy where the energy is needed most—urban city centers. This would cut down on the aforementioned distribution problems and certainly reduce the amount of carbon emissions to slow global warming and increase conservation.

Another means of decreasing inefficiencies in the current system is to decentralize the grid. Locating smaller and more efficient energy generation systems where they are needed most will increase efficiency by reducing the amount of energy lost in transmission. Other infrastructure maintenance requirements, such as power lines, transformers, and power stations, could be reduced, and in some cases eliminated, thereby inherently reducing the cost of maintaining the current infrastructure.

Generally, renewable energy resources need to be stored after generation. Although, ideally, the system generates energy on-demand—i.e. on a basis as it is needed—instead of requiring storage. An energy infrastructure organized to produce energy as-needed will be the most efficient. One problem with solar power or wind turbines, however, is that energy can only be generated when it is sunny or windy. Thus, the system would still need to be designed to store excess energy generated at times of high energy generation and to efficiently deliver stored energy at times of low energy generation (or at times where the energy consumption exceeds the energy generation). Decentralizing the generators in this respect could more specifically target energy delivery where it is needed most at the times it is needed most. This improves efficiency and decreases energy loss.

On the other hand, one particularly desirable aspect of renewable energy is that the source of energy is continuous. In this respect, producers of such renewable energy technologies have little investment and upkeep once the renewable energy source is put in place. Contrast this scenario to producers of oil and coal. These energy producers are constantly vying to purchase these ever decreasing resources. As the sources become scarcer, the price rises as a result. Eventually, prices may rise to an extent that makes the energy source no longer affordable. Producers of renewable energy do not have the same problems. Renewable energy providers typically have a constant flow of free energy.

Hence, there is a constant need for alternate forms of energy that due less damage to the environment. It is particularly desirable if these alternate forms of energy are able to reduce or even eliminate harmful carbon or sulfur compound emissions that cause health problems, damage the environment and erode protective layers in the atmosphere. Presently, most of the consumable energy worldwide is generated by burning carbon and related carbon-based compounds such as coal and oil. Clean energy reduces and preferably eliminates combustion of these carbon-based materials. Common forms of "clean" energy include wind, solar, thermal and hydroelectric energy. These energy sources, as described above, are also largely renewable. Other forms of clean energy may include harnessing or recovering energy from normal pressures such as wind and water volumes or waves. In some aspects nuclear power is considered "clean" energy, relative to other forms of carbon-based energy that produce emissions. But, nuclear power plants, especially in the United States, face fierce opposition due to the stigma that associates nuclear power with nuclear waste and nuclear weapons.

Vehicles used for transportation, such as automobiles, airplanes, trains, and ships, use more carbon fuel than any other form of consumable energy. Most of these vehicles are equipped with combustion-based engines that burn gas and oil in order to provide energy for the vehicle to move. The resultant emissions from the combustion process are commonly dispensed into the atmosphere. Similarly, power plants that burn oil, gas and coal also emit harmful by-products into the atmosphere. Over the years, local, state and federal governments have increased the requirements for more efficiently recovering the energy generated by the combustion processes, and have increased the requirements for recycling or reducing harmful emissions. One aspect of harnessing energy resultant from the combustion process that is often overlooked is the recovery of energy from moving vehicles. Some of the newer electric or hybrid (combined internal combustion engine and battery) vehicles are designed to recover energy from processes inherent in the navigation of the vehicle, e.g. braking. It would be especially beneficial to harness or recover other wasted energy derived from fossil fuels or other energy sources.

There exists, therefore, a significant need for an system and method to generate and store electrical energy created by intermittent pressure. Such a system and method preferably makes use of one or more compressible bodies or tubes housing a fluid medium that can be compressed or pressurized. Pressurized fluid could then be used to operate a pressure-activated pneumatic motor or directly drive a turbine. The pressure required to pressurize or compress the fluid within the bodies or tubes preferably originates from natural forces such as wind or oceanic waves/currents or from moving vehicles, such as cars, trains or airplanes. The present invention fulfills these needs and provides further related advantages.

SUMMARY OF THE INVENTION

The system for generating and storing clean energy, as disclosed herein, includes a flexible body externally exposed to an intermittent localized pressure. A pair of one-way check valves are coupled to the flexible body to facilitate unidirectional flow of fluid through the flexible body. A first valve, for example, is configured to facilitate unidirectional fluid flow into the flexible body and a second valve may be configured to facilitate unidirectional fluid flow out from the flexible body. A substantially rigid and planar base is positioned between the flexible body and the intermittent localized pressure. This enables pressure point peristaltic expansion and compression cycles along a portion of the flexible body from the intermittent localized pressure. As a result, this causes positive fluid displacement into and out from the flexible body through the first valve and the second valve, respectively.

In one embodiment, the flexible body includes a plurality of flexible tubes positioned substantially parallel to one another. Preferably, each of the flexible tubes are individually exposed to the intermittent localized pressure. A turbine may couple to one or more of the flexible tubes to generate electricity when pressurized fluid flows therethrough. Here, the plurality of turbines may be disposed within one or more of the tubes. Energy is generated as pressurized fluid exits the tubes through the second valve, preferably disposed between one or more of the flexible tubes and the manifold. Alternatively or additionally, pressurized fluid may be delivered to another larger turbine via the manifold fluidly coupled to one or more of the flexible tubes. The manifold is designed to collectively receive pressurized fluid from multiple tubes for eventual delivery to the energy generation system. A pressure-activated motor may also be coupled to the manifold as an additional means for generating electricity.

The system for generating and storing clean energy may be disposed in a number of different environments. For example, in a particularly preferred embodiment, the flexible body (or combination of multiple flexible bodies or tubes) are submerged in an aquatic environment to capture energy from naturally generated waves or currents. In this embodiment, the flexible body and planar base couple to a support mountable to an ocean floor or a bulkhead. The flexible body may be positioned at any angle between being parallel or perpendicular to the flow of the waves/current. Alternatively, the flexible body may be disposed in a portion of a roadway and externally exposed to vehicular traffic. Here, peristaltic compression and expansion of the flexible tubes occurs when vehicle tires drive over the flexible tubes. In a similar embodiment, the flexible body or a plurality of tubes may be disposed between compressible portions of the roadway. Here, the compressible sections of roadway are biased away from one another by one or more springs. The weight of a vehicle passing thereover compresses the springs so that opposite portions of the roadway collapse on the flexible tubes disposed thereunder. In turn, pressurized fluid exits the flexible body to be later harnessed as energy. In each of these embodiments, the flexible body is preferably made from a shape-memory material that retains its original shape once the load applied thereto is removed. Additionally, the intermittent localized pressure may come from a variety of sources that include wind pressure, wave pressure, or the weight of the vehicle.

Furthermore, an energy generation system may be in fluid communication with the flexible body. The energy generation system is preferably designed to generate electrical energy from pressurized fluid flow resultant from the peristaltic expansion and compression cycles of the flexible body. As such, the clean energy generation and storage system may include a tank coupled to the flexible bladder for storing pressurized fluid therein. A bladder may be placed in fluid communication between the flexible body and the tank to amplify compression of the pressurized fluid to the tank. As a result, the pressurized fluid from the tank may be used operate an alternator fluidly coupled to the tank. Energy generated by the alternator may then be stored in a battery for later use or consumed immediately through an electrical grid.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 11 is a side schematic view of the system of FIG. 10, illustrating peristaltic-type compression of a fluid-filled tube into the air bladder by a tire;

FIG. 12 is an enlarged front schematic view of the tire flattening the fluid-filled tube of FIGS. 10-11;

FIG. 13 is a partial-cutaway side view illustrating an alternative embodiment of the fluid-based energy generation system of FIGS. 9-12, utilizing a roller deployed underneath the tire to more thoroughly deflate the tube;

FIG. 14 is an alternative schematic view of a fluid-based energy generation system, illustrating the compressible bladders disposed within a panelized system that can be placed on the roadway or under the path of a vehicle;

FIG. 15 is a cross-sectional view of the bladder and panel system in an uncompressed position, taken about the line 15-15 in FIG. 14;

FIG. 16 is a cross-sectional view similar to FIG. 15, wherein the bladder is fully compressed by the panel system after application of the weight of a vehicle;

DETAILED DESCRIPTION OF THE PREFERRED EMBODIMENTS

Figure 1:
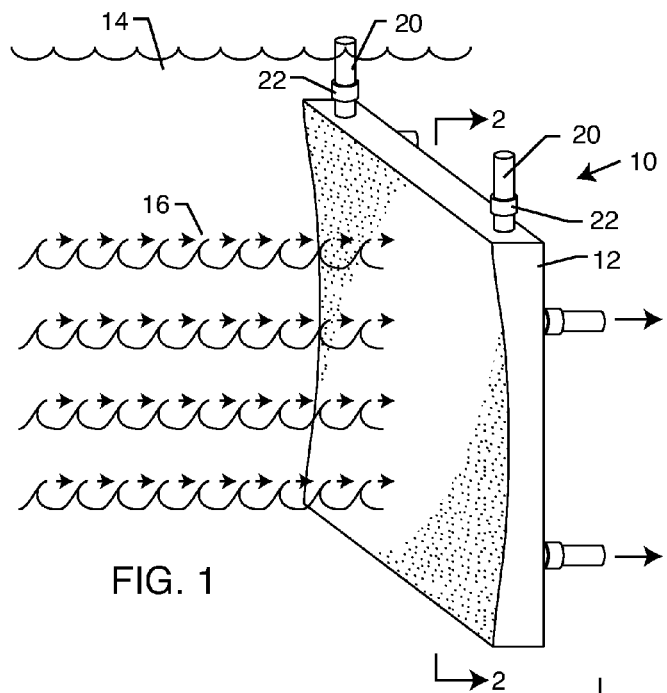
FIG. 1 is an environmental perspective view of a compression cycle of a fluid-based energy generation system, as disclosed herein, deployable in the ocean to generate energy from natural movement of oceanic waves/currents.

As shown in the drawings for purposes of illustration, the present invention for a system and method of generating and storing clean energy is shown in several embodiments in FIGS. 1-31. In general, the embodiments disclosed herein use intermittent, naturally recurring loads or pressures to generate electrical energy. The various embodiments described with respect to FIGS. 1-31 collect energy from various natural sources such as wind pressure, oceanic waves, natural vibrations, natural movement of waterways, storm water runoff, etc., or human generated pressures that include the weight of people, cars, trains, airplanes, or other transportation vehicles. The first set of embodiments (FIGS. 1-6) are particularly preferred because there is a constant supply of renewable fuel (e.g. air or oceanic waves) from which to generate electricity. Such embodiments are also particularly preferred as the carbon footprint from generating electricity from these energy sources is minimal compared to other traditional forms of generating electricity.

The embodiments described herein also offer a means for recycling energy from virtually any weighted source or object (e.g. vehicles) that exert forces on the ground, walls or other stationary objects. The principles of generating and storing energy as disclosed in the embodiments herein rely on converting point loads and/or pressures into electrical power. The basic concept can be applied to almost any point load and/or pressure that exist in virtually every aspect of life. Preferably, deployment is done in a non-intrusive manner and in an efficient way to effectively harvest renewable or naturally occurring point loads through the use of atmospheric air, water or another fluid as a means to compress fluid and generate electrical energy from compressed fluids. Accordingly, the system disclosed herein is inexpensive to manufacture and assemble, easily maintainable and the energy stored as compressed fluid does not "spoil" like other forms of energy if stored for extended periods of time (such as gasoline). A person of ordinary of skill in the art will readily recognize that the basic principle of generating and storing energy can be used in small scale deployments, large scale deployments, or in an array of small and/or large scale deployments, depending on the desired application.

FIG. 1 illustrates one embodiment of a fluid-based energy generation system 10. Here, the fluid-based energy generation system 10 is deployed in an aquatic environment such as the ocean, a river or other body of water that generates intermittent pressure. In one embodiment, the fluid-based energy generation system 10 depicted in FIGS. 1-4 may be installed along shoreline bulkheads or ocean bottoms such that the varying wave pressures on the bulkheads/ocean bottoms propagate compression/inflation "cycles".

The fluid-based energy generation system 10 shown in FIG. 1 includes a bladder 12 that is substantially submerged in a fluid medium 14. The fluid-based energy generation system 10 may also include multiple bladders 12 interconnected to one another to increase the surface area subjected to intermittent pressures generated by waves in an ocean, for example. The bladders 12 are preferably generally elongated and planar so as to be subjected to a wider range of surface area pressure. The bladders 12 are also preferably constructed to allow differential compression over the planar surface thereof, as described in more detail below.

In FIGS. 1-4, the fluid medium 14 is water, but a person of ordinary skill in the art will readily recognize that the fluid medium 14 could include other fluids, including air (e.g. wind or a jet stream that generates intermittent pressures). In FIGS. 1-4, one or more pressure generating waves or currents 16 flow toward the bladder 12. The bladder 12 is initially filled with a working fluid 18 that is relatively lighter in density than the fluid medium 14 that generates the wave/current 16. In fact, the fluid medium 14 should be of sufficient density relative to the bladder 12 to enable compression of the bladder 12 when the intermittent pressure is exerted thereon. Therefore, the bladder 12 may be made from several different materials depending on its deployment. For example, for capturing wind energy, the bladder 12 may be made from a relatively light and highly flexible material like a sail or other comparable material. This enables the bladder to flex easily under light wind pressures. Alternatively, the bladder 12 may be made from a more robust, yet flexible material, to withstand being continuously submerged in an aquatic environment. The bladder 12 may also be more robust in this environment because water has a higher density than air and is more capable of bending/flexing stronger materials. In FIGS. 1-4, the working fluid 18 that fills the bladder 12 may be air or water. Air enters the bladder 12 though an input line 20 open to the atmosphere and passes through a one-way inlet check valve 22 on its way to the interior of the bladder 12. Alternatively, water may enter the bladder 12 through the input line 20 in the event the system 10 utilizes water as the working fluid 18 (e.g. when the system 10 is completely submerged in the fluid medium 14). The check valve 22 permits the working fluid 18, in this embodiment atmospheric air or water, to enter through the input line 20, but not exit. In other words, the inlet check valve 22 permits unidirectional flow into the bladder 12.

Figure 2:
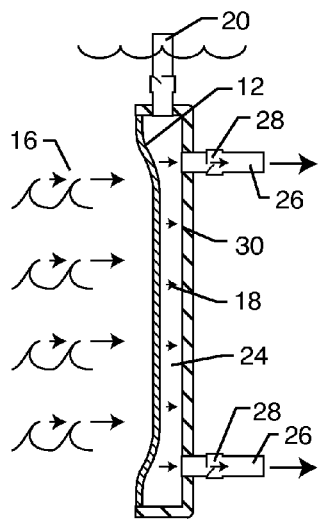
FIG. 2 is a cross-sectional view of the system of FIG. 1, taken about the line 2-2.

FIG. 1 illustrates compression of the bladder 12 as one or more of the waves/currents 16 depress the bladder 12. The bladder 12 depresses into an interior chamber 24 (FIG. 2). As a result, the working fluid 18 therein is pushed out from within the interior chamber 24 through an exit line 26. The arrows in the cross-sectional view of FIG. 2 illustrate the movement of the working fluid 18 out from within the interior chamber 24. Like the input line 20, the exit line 26 also preferably includes a one-way outlet check valve 28 (shown open in FIG. 2) coupled thereto so that the working fluid 18 may exit the interior chamber 24, but not reenter. In FIGS. 1-2, the bladder 12 flexes inwardly toward a substantially planar and rigid backing 30 that supports the bladder 12, the input line 20, the inlet check valve 22, the exit line 26 and the outlet check valve 28. The backing 30 also provides a surface against which the bladder 12 may compress to perform peristaltic energy generation through the compression/expansion cycles generated by the waves/currents 16.

Figure 3:
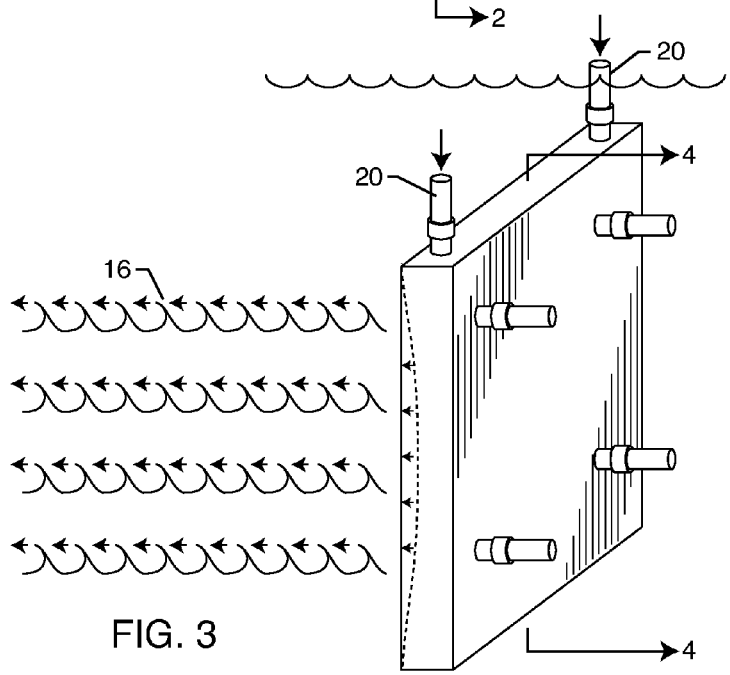
FIG. 3 is an environmental perspective view of an expansion cycle of the fluid-based energy generation system of FIG. 1.
Figure 4:
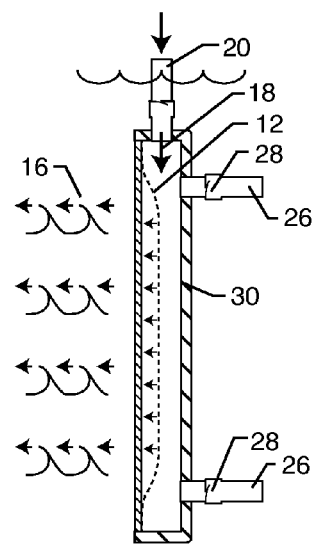
FIG. 4 is a cross-sectional view of the system of FIG. 3, taken about the line 4-4.

Accordingly, when the waves/currents 16 recede, as shown in FIGS. 3-4, the bladder 12, which is preferably formed from a shape-memory material that automatically returns or inflates once the intermittent pressure is removed, moves back toward the expanded or inflated configuration shown in FIGS. 3-4. As the bladder 12 moves outwardly (i.e. to the left in FIGS. 3-4), the volume in the interior chamber 24 increases. This movement creates a vacuum within the interior chamber 24. This causes the outlet check valves 28 to close and the inlet check valves 22 to open. Atmospheric air is drawn into the interior chamber 24 through the input line 20 and the inlet check valve 22, as designated by the directional arrows therein. The re-inflated interior chamber 24 is then ready for another wave/current 16 to contact the surface of the bladder 12 to repeat the compression cycle. The compression, inflation cycles continually repeat with each wave/current 16 such that there is a constant generation of energy from the natural movement of the waves. The working fluid 18 pushed out of the interior chamber 24 is later harnessed as energy, as described in more detail below. For example, as a load/pressure is exerted on the bladder 12, the working fluid 18 in the interior chamber 24 may be forced out through the exit line 26 and the outlet check valve 28 and into a compression tank for storage. The compression tank may be coupled to an energy generation system (as described in more detail below), such as a low pressure pneumatic air motor.

Figure 5:
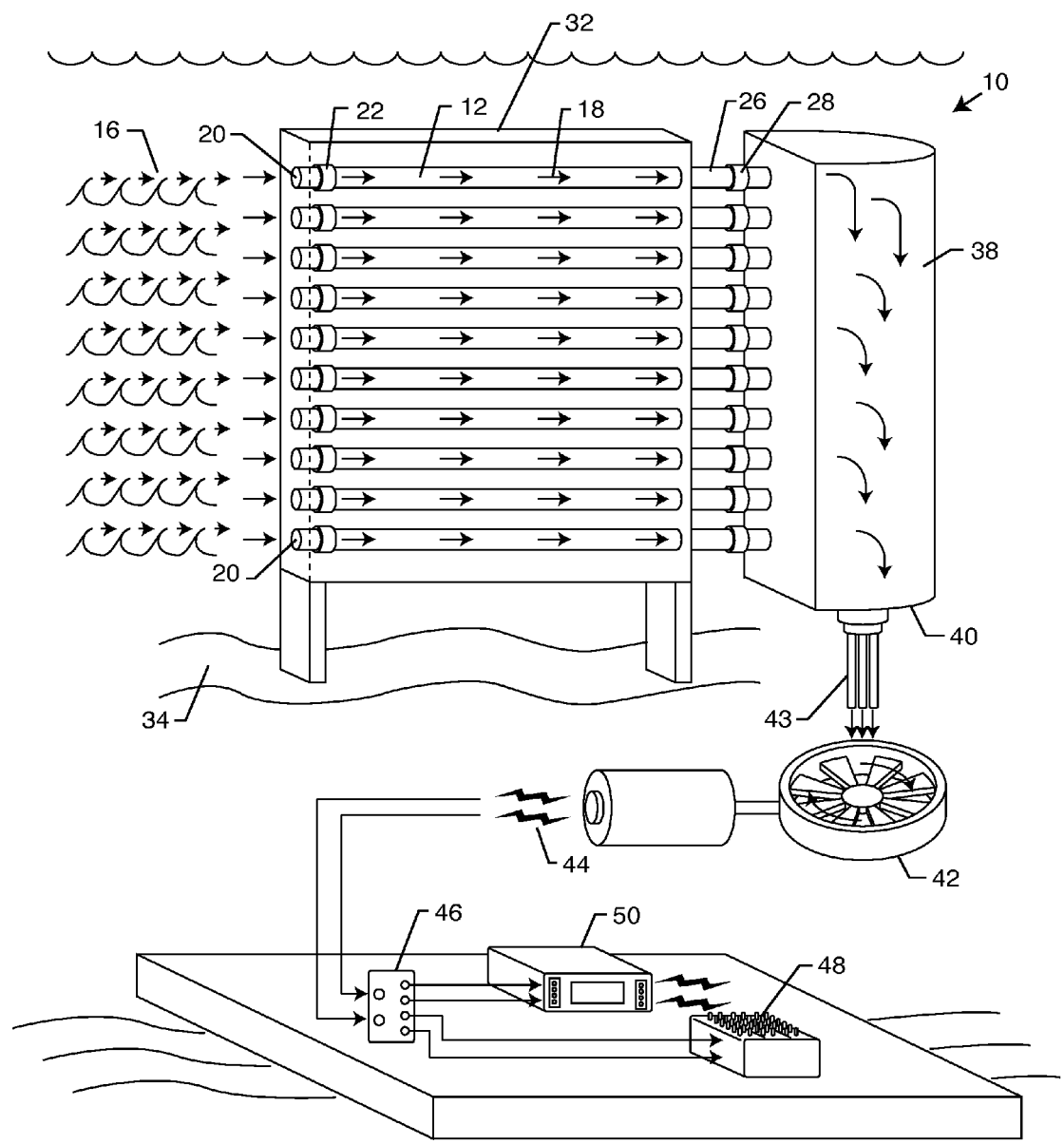
FIG. 5 is an environmental perspective view illustrating a fluid-based energy generation system similar to FIG. 1, incorporating a turbine to generate energy.

FIG. 5 further illustrates the fluid-based energy generation system 10 depicted in FIGS. 1-4. In this embodiment, multiple bladders 12 are fixedly attached to an equipment cabinet 32 that is preferably anchored relative to the flow of the waves/currents 16, e.g. being anchored to a seafloor 34. The bladders 12 are once again submerged in an aquatic environment to utilize the intermittent pressures naturally generated by ocean waves/currents 16. Here, the surrounding water is used as the working fluid 18 instead of atmospheric air, as described above. The bladders 12 may be placed in nearly any position relative to the waves/currents 16. For example, when the bladders 12 are positioned inline or parallel with the flow of the waves/currents 16, the working fluid 18 enters the bladders 12 through the input lines 20 on one side of the array of bladders 12. Each input line 20 includes the inlet check valve 22 to facilitate unidirectional flow into the fluid-based energy generation system 10 and to prevent backflow. In this position, additional waves/current pressures force the working fluid 18 through bladders 12. The working fluid 18 (i.e. water) exits the bladders 12 through the exit line 26 and the outlet check valve 28 (again, to facilitate unidirectional flow out of the system 10) on an opposite side of the equipment cabinet 32. A fluid manifold 38 preferably collects or aggregates the working fluid 18 from one or more of the bladders 12. The working fluid 18 exits the manifold 38 through a one way turbine valve 40 and into a turbine 42 through one or more hoses 43. The turbine valve 40 ensures unidirectional movement of the working fluid 18 out front the fluid manifold 38. The working fluid 18 passing through the turbine 42 causes the blades to spin, thereby generating electricity. An electric current 44 generated by the turbine 42 is coupled to a switch 46 that couples either to a battery 48 (storage for later use) or a inverter 50 (for immediate consumption).

Alternatively, the equipment cabinet 32 may be open on one side (i.e. exposed to wave/current pressure) similar to the embodiments described above with respect to FIGS. 1-4. Here, the bladders 12 are positioned between the aforementioned substantially planar and rigid backing 30 and the intermittent pressures generated by the waves/current 16. The bladders 12 flex or compress under pressures from the waves/currents 16 to force the working fluid 18 therein out into the fluid manifold 38. The positioning of the inlet check valves 22 and the outlet check valves 28 prevent the working fluid 18 from exiting through the left-hand portion of the fluid-based energy generation system 10. These features facilitate unidirectional movement to the fluid manifold 38 so that energy can be generated by the turbine 42. The pressure on the bladders 12 is released during the next portion of the compression/expansion cycle to allow the bladders 12 to generate a vacuum therein to draw additional working fluid 18 in from the surrounding environment. The system 10 is then set for another set of pressures to be exerted on the bladders 12 to propagate of the compression cycle. The intermittent pressures generated by the ebbing and flowing of the waves/current 16 results in compression/expansion cycles of the bladders 12. In turn, energy can be continually captured from the natural movement of the waves/current 16.

Additionally, positioning the bladders 12 at positions between the parallel and perpendicular flow of the waves/current 16 may advantageously facilitate fluid flow through the interior of the bladders 12 by utilizing the flow of the current and any external pressures on the bladders 12, in the manners described herein.

Figure 6:
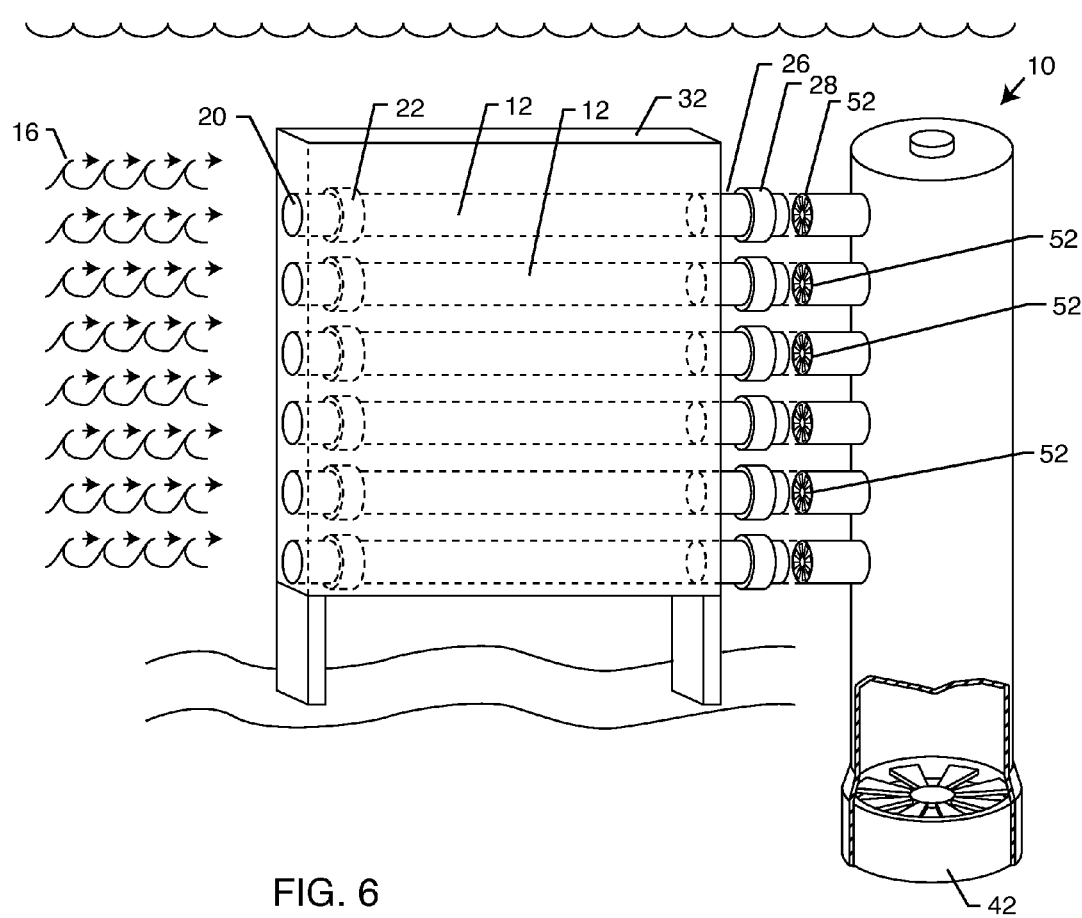
FIG. 6 is an environmental perspective view similar to FIG. 5, illustrating further incorporation of a plurality of energy generating turbines at the ends of a plurality of tubes.

FIG. 6 illustrates another alternative embodiment of the fluid-based energy generation system 10, as described above with respect to FIG. 5. In this embodiment, the array of bladders 12 may be positioned anywhere between being substantially parallel or substantially perpendicular to the flow of the waves/currents 16. Preferably, the bladders 12 are positioned at some angle relative to the flow of the waves/current 16 to facilitate both movement of new fluid into the bladders 12, compression of the bladders 12, and peristaltic movement of the working fluid 18 out through an opposite end thereof. The cabinet 32 is preferably open to the wave/current flow 16 to facilitate peristaltic movement of the working fluid 18 through the interior of the bladders 12. Although, the bladders 12 may be fully enclosed by the equipment cabinet 32, as described above.

The main difference in this embodiment is that the system 10 includes a plurality of bladder turbines 52 positioned just beyond the outlet check valves 28 at the end of the exit line 26 of each bladder 12. Accordingly, the open ends of the bladders 12 at the input line 20 accept water or other fluid from the surrounding environment. The submersible and compressible bladders 12 fill with water that becomes the working fluid 18. As described above, the working fluid 18 travels through the length of the bladders 12 from external pressures, i.e. new fluid entering through the input line 20 and peristaltic pressure applied directly to the exterior of the flexible bladders 12. The working fluid 18 then exits through the exit line 26 and the outlet check valve 28. At this point, instead of merely entering the fluid manifold 38, as in FIG. 5, the working fluid 18 in each bladder 12 passes through a respective bladder turbine 52. The bladder turbines 52, which are optional, are somewhat smaller in diameter than the turbine 42 (also shown in FIG. 6) to generate electricity from the working fluid 18 flowing through each of the bladders 12. In the embodiment shown in FIG. 6, the system 10 is able to generate electricity at multiple points—i.e. one at each of the exit points with the bladder turbines 52; and a second at the exit point from the fluid manifold 38 with the submersible turbine 42, as described above with respect to FIG. 5. The system 10 illustrated in FIG. 6 may then generate, store or use the aforementioned electrical current 44 through use of the switch 46, the battery 46 or the inverter 50.

Figure 7:
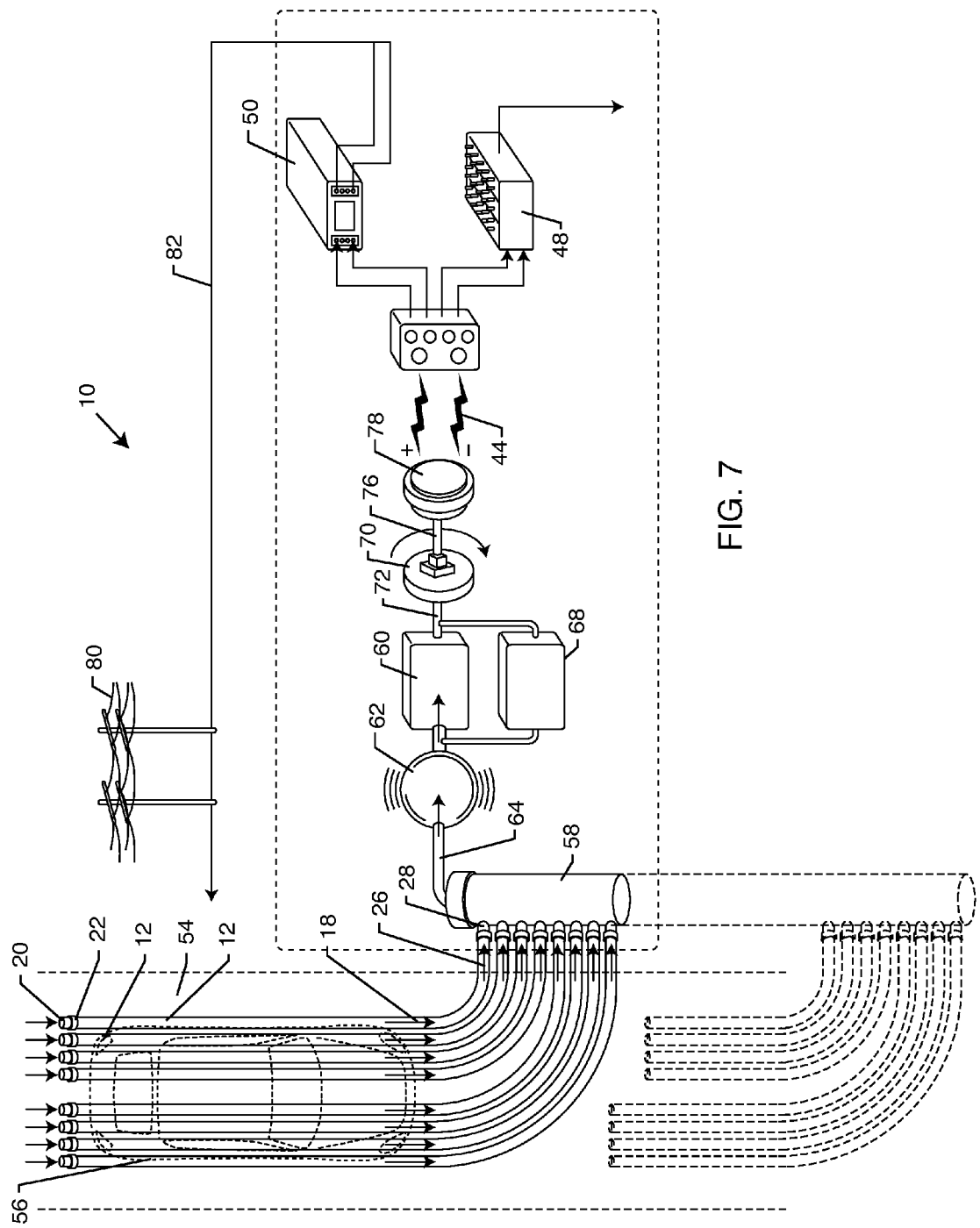
FIG. 7 is a schematic view illustrating the fluid-based energy generation system deployable within a roadway.

FIG. 7 illustrates an alternative embodiment of the fluid-based energy generation system 10 described above. Here, the fluid-based energy generation system 10 is deployed in association with a roadway 54, and along the pass of a vehicle, to harness energy from vehicles driving thereover. Similar to the embodiments described above, the system 10 includes one or more of the bladders 12 positioned inline or parallel to the flow of vehicular traffic. The bladders 12 receive fluid through the input line 20. Preferably, the input line 20 is coupled to the one-way check valve 22 open to the atmosphere to prevent any fluid within the bladders 12 from exiting back out through the input line 20. This facilitates unidirectional flow through the bladders 12. The bladders 12 are preferably formed from a shape-memory material that automatically returns to form after being compressed or depressed by a load/pressure. When the bladder 12 re-inflates, it draws atmospheric air therein through the input line 20 and through the inlet check valve 22, in accordance with the embodiments described above. As shown in FIG. 7, multiple systems 10 could be used together in parallel or in series.

The fluid-based energy generation system 10 depicted in FIG. 7 generates energy when a load/pressure from a vehicle 56 is applied along the length of the bladders 12. Of course, a person of ordinary skill in the art will readily recognize that the size of the bladder 12 may vary depending on the application. In the embodiment described with respect to FIGS. 7-16, the bladder 12 may be subject to a load/pressure from an automobile. Other embodiments may require that the bladder 12 be subjected to smaller or larger loads/pressures, for example from pedestrians, bicycles, trains or airplanes. When the automobile or other vehicle travels over the bladder 12, the bladder 12 depresses thereby forcing the working fluid 18 therein out through the exit line 26 coupled to the outlet check valves 28. The outlet check valves 28 similarly permit one-way flow out of the bladders 12 and into an air manifold 58. The check valves 22, 28 are configured to permit unidirectional flow of the working fluid 18 through the input lines 20, the bladders 12, and the exit lines 26. In FIG. 7, working fluid 18 exiting the bladders 12 immediately enter an air manifold 58 positioned off to the side of vehicular travel, such as off to the side of the roadway 54. Fluid compressed in the bladders 12 as a result of the vehicle 56 travelling thereover collects in the air manifold 58 for eventual storage in a compressed air tank 60.

In one embodiment, an air bladder 62 may be deployed between the air manifold 58 and the compressed air tank 60 to facilitate the compression of the working fluid 18 in the system 10. Here, compressed working fluid 18 exiting the air manifold 58 enters the air bladder 62. The air bladder 62 may be made from an elastic or stretchable material that expands as it receives pressured air or other fluid when the vehicle 56 passes over and compresses one or more of the bladders 12. Of course, a one-way check valve 64 is positioned between the air manifold 58 and the air bladder 62 to ensure that the working fluid 18 in the air bladder 62 does not reenter the air manifold 58 when the pressure from the vehicle 56 is removed from the bladders 12. During compression, the air bladder 62 fills with compressed working fluid 18 and expands. The elastically expanded air bladder 62 compresses the working fluid 18 therein for storage in the compressed air tank 60 or the reserve compressed air tank 68.

In an alternative embodiment with respect to FIG. 7, the compressed working fluid 18 exiting the air manifold 58 may be directed directly to the air tank 60. In this embodiment, the air bladder 62 is optional and may not be used at all. Here, the one-way check valve 64 would be positioned between the air manifold 58 and the air tank 60 to ensure pressurized or compressed fluid does not return back to the manifold 58 or the bladders 12.

Figure 8:
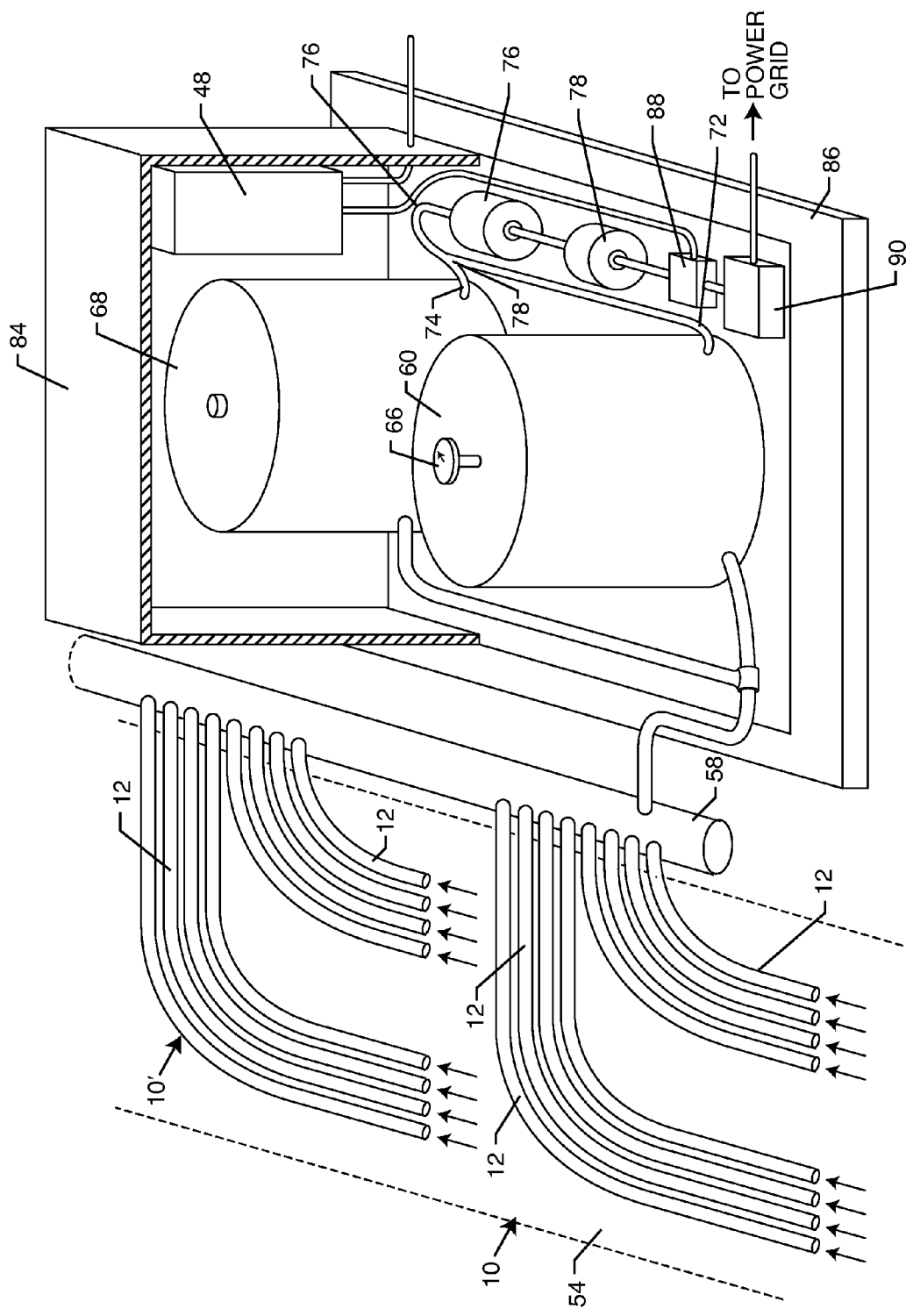
FIG. 8 is an environmental perspective view illustrating a plurality of bladders coupled to a charging station on the side of the roadway or vehicular pathway.

The compressed air tank 60 may be connected to a single bladder 12, or multiple bladders 12 as shown in FIGS. 7-8. A pressure gauge 66 may provide visual identification of the level of pressure within the compressed air tank 60 and be configured to re-directed compressed air to the reserve compressed air tank 68 at a predetermined threshold. The compressed air tank 60 may also be used in conjunction with a reserve compressed air tank 68, depending on the power requirements. For example, the compressed air tank 60 and the reserve compressed air tank 68 may receive increased amounts of pressurized fluid at times of high traffic flow (e.g. rush hour in the morning or evening). It would be beneficial, therefore, to collect as much naturally occurring energy as possible during these times. At lower energy generation times, e.g. at late night, the system 10 may not be able to generate enough energy to provide a constant supply. Hence, pressurized working fluid in the reserve compressed air tank 68 may be utilized to provide a constant supply of electricity, as may be needed.

Energy may be generated from the compressed working fluid stored in the compressed air tank 60 and, optionally, the reserve compressed air tank 68, through use of a low pressure pneumatic air motor 70. This is accomplished by releasing compressed air from within either or both of the compressed air tank 60 or the reserved compressed air tank 68. The diagrammatic view of FIG. 7 illustrates the release of pressurized air out through a compressed air tank delivery line 72 connected to the pneumatic motor 70. An alternative setup might include releasing compressed air out from the compressed air tank 60 though the compressed air tank delivery line 72 and from the reserve compressed air tank 68 through a reserved compressed air tank delivery line 74, as shown in FIG. 8, before delivery to the pneumatic motor 70. In FIG. 8, the compressed air tank delivery line 72 and the reserve compressed air tank delivery line 74 combine into a pneumatic motor input line 76 through a bi-pass valve 78 (when necessary).

The low pressure pneumatic air motor 70 operates as would any pneumatic air motor known in the art. Preferably, the low pressure pneumatic air motor 70 rotates or operates a series of gears, pulleys or other linkages, generically identified as numeral 76 in FIG. 7, as needed to operate a low rpm permanent magnetic alternator 78. The permanent magnetic alternator 78 supplies the electric current 44, similar to that described above with respect to FIGS. 1-4, to the switch 46, which supplies energy to either the battery 48 or the inverter 50. In this embodiment, the inverter 50 is shown to be in electrical communication with a power grid 80 via a series of wires 82.

FIG. 8 further illustrates deployment of the fluid-based energy generation system 10 in association with the roadway 54. Here, two systems 10 and 10' are shown in series with one another. As shown, the plurality of bladders 12 are positioned lengthwise and generally parallel to one another within the roadway 54. Each of the bladders 12 are open to the atmosphere and direct contact by vehicles 56 travelling thereover. Preferably, the bladders 12 are positioned apart approximately with width of a car or truck to ensure maximum contact efficiency in harnessing energy from passing traffic. Each of the bladders 12 are preferably open to the atmosphere and take in atmospheric air through the inlet check valve 22 (not shown), similar to the embodiment in FIG. 7. The atmospheric air is used to replenish the volume of air within the bladders 12 after compression thereof. Each of the bladders 12 may be mounted within a rubber matting to provide strength and stability to the bladders 12; or mounted and configured as depicted in FIGS. 14-16. The plurality of bladders 12 are in fluid communication with the air manifold 58 housed within a charging station 84 and supply compressed air thereto. The charging station 84 is preferably mounted to a pre-fabricated concrete pad 86 along the side of the road. As shown, the bladders 12 are disposed along the roadway 54 for a predefined distance before curving off to the side of the roadway 54 next to the charging station 84. Each of the bladders 12 connect to the air manifold 58 by extending through the sidewall of the charging station 84. In this particular embodiment, the bladders 12 are used as a peristaltic-type pump system for harnessing electrically energy. For example, the air manifold 84 supplies compressed air into the compressed air tank 60 and/or the reserve compressed air tank 68. Energy is generated from the air tanks 60, 68 by operating the low pressure pneumatic air motor 70 with the compressed air. The pneumatic air motor 70 turns the magnetic alternator 78, which is connected to a switch 88 and an inverter 90. The switch 88 determines whether to feed electricity to the optional battery 48 or to the inverter 90 for eventual consumption in the power grid.

The basic operation of the embodiment disclosed in FIGS. 7-8 is to harness energy from a "point load" and/or "pressure" generated by that of the weight of a mass, such as a vehicle or, more specifically, a motor vehicle. The "point load" and/or "pressure" is equally applicable to other forms of transportation such as trains, airplanes, etc. or, as described above, various naturally occurring forces such as wind pressure, wave pressure, earth pressure, sound pressure or vibrations. In fact, the basic operation of the system 10 is applicable to virtually anything that applies a temporary point load/pressure to a certain point or area. In general, the fluid-based energy generation system 10 works in conjunction with only a few components: the compressible bladders 12 that deliver a volume of air or fluid to the compressed air tank 60, which is used to operate the low pressure pneumatic air motor 70 and the low rpm permanent magnetic alternator 78 (or an rpm wind-type generator). Hence, the system 10 can be deployed in city centers and other areas on an as-needed basis to efficiently provide energy where needed. It also reduces the reliance on large and expensive electrical networks that stem from large coal burning or nuclear power stations. Furthermore, the system described herein also encourages the user of electric cars by having the capability of providing frequently and conveniently placed charging stations.

One common place to deploy such an embodiment is in association with automobile speed bumps. Traditionally, automobile speed bumps signal drivers to slow down when approaching potential hazards, such as school zones. Other automobile speed bumps are used in conjunction with residential streets and highway toll plazas. Deployment of the fluid-based energy generation system 10 is particularly useful as a substitution for or used in association with traditional speed bumps, as described above. Alternatively, this embodiment could be used on some streets where traffic is light, such as in places where pressure sensitive traffic signal switches are buried under the roadway. When a car drives over the pressure sensitive device, the weight of the vehicle causes the switch to trip, thereby turning the signal light green and allowing the car to pass. Deployment of the fluid-based energy generation system 10 underneath sections of roadway, such as may be deployed with the aforementioned sensors, could harness additional energy that would otherwise be wasted from a vehicle idling at the stop light.

As described above with respect to FIGS. 7-8, a known point load or pressure may be used to compress a volume of air or fluid in the bladder 12 (or a comparable billow or rubber hose). The compressed volume of air is then transferred to the compressed air tank 60, where the air or fluid is stored under pressure. The compressed air in the tank 60 is then used to run the pneumatic motor 70, which turns a wind-type generator. The original point load/pressure of the vehicle/person/wave is thereby turned into electrical power. Depending on the consistency of the point loads/pressures being harvested in this way, the reserve compressed air tank 68 may need to be included on-line to ensure that a minimum air pressure is always maintained within the tank(s) 60, 68 supplying the pneumatic motors. Of course, multiple systems 10 can be connected together in either series or parallel. Once the point load/pressure is removed from the "billow" or bladder 12, the volume of air in the bladder 12 needs to be replenished immediately so that it is available for the next load or pressure. The bladder 12 preferably returns back to its original shape through use of a shape-memory material or a vacuum. In doing so, the bladder 12 intakes atmospheric air or another fluid to fill its volume. Then, the bladder 12 is ready for compression by the next load or pressure. This would be considered as one "energy cycle". In many applications, several of these systems 10 could be installed next to each other, such as along a length of the roadway 54, and utilize the same loads/pressures for generating electrical power. Thus, the same loads/pressures can be harvested for multiple opportunities to generate electrical power.

Figure 9:
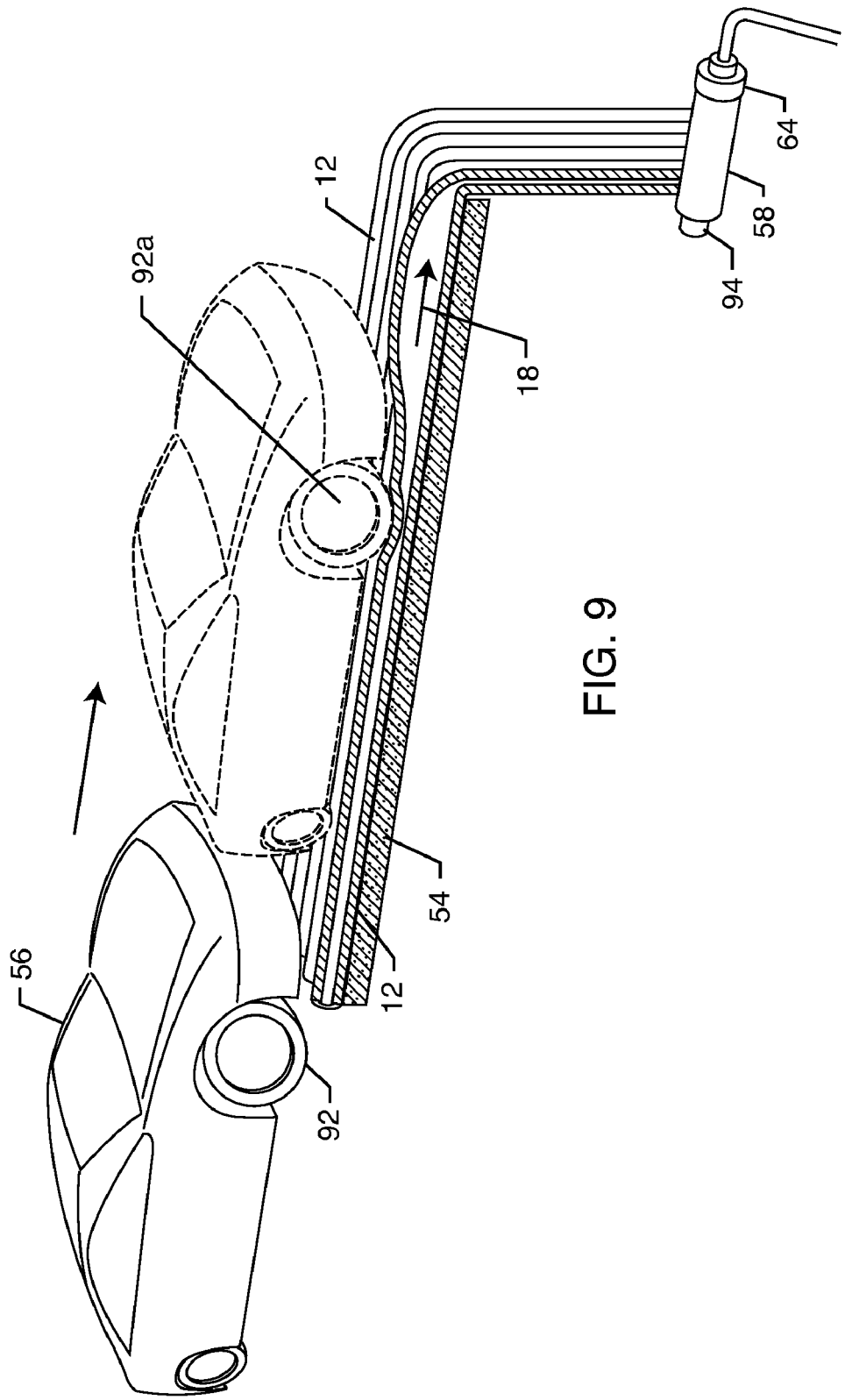
FIG. 9 is a partial-cutaway schematic view illustrating compression of fluid within one of the tubes depicted in FIGS. 7-8.

FIGS. 9-13 more specifically illustrate the vehicle 56 actuating one of the bladders 12 to activate the peristaltic aspect of the fluid-based energy generation system 10. FIG. 9 is a cut-way environmental view of one embodiment the fluid-based energy generation system 10 deployed with use of the aforementioned bladders 12 in FIGS. 7-8. As shown in FIG. 9, a load in the form of a tire 92 rolls along the roadway 54 compressing the bladder 12. The tire 92a (shown in phantom) continues to compress the bladder 12, thereby forcing compressed air to enter the air manifold 58. It is the weight of the vehicle that enables the tire 92, 92a to compress one or more of the bladders 12 simultaneously. The movement of the vehicle 56 along the roadway 54 acts as a peristaltic pump to move air or fluid through the bladder 12 and into the air manifold 58. Preferably, a new supply of atmospheric air is immediately replenished back into the bladder 12 as the tire 92, 92a passes thereover. In accordance with the embodiment described with respect to FIGS. 7-8, compressed air within the air manifold 58 exits through the one-way check valve 64 for delivery to the aforementioned air tanks. The air manifold 58 includes a plug 94 to ensure that the compressed air travels only out through the one-way check valve 64.

Figure 10:
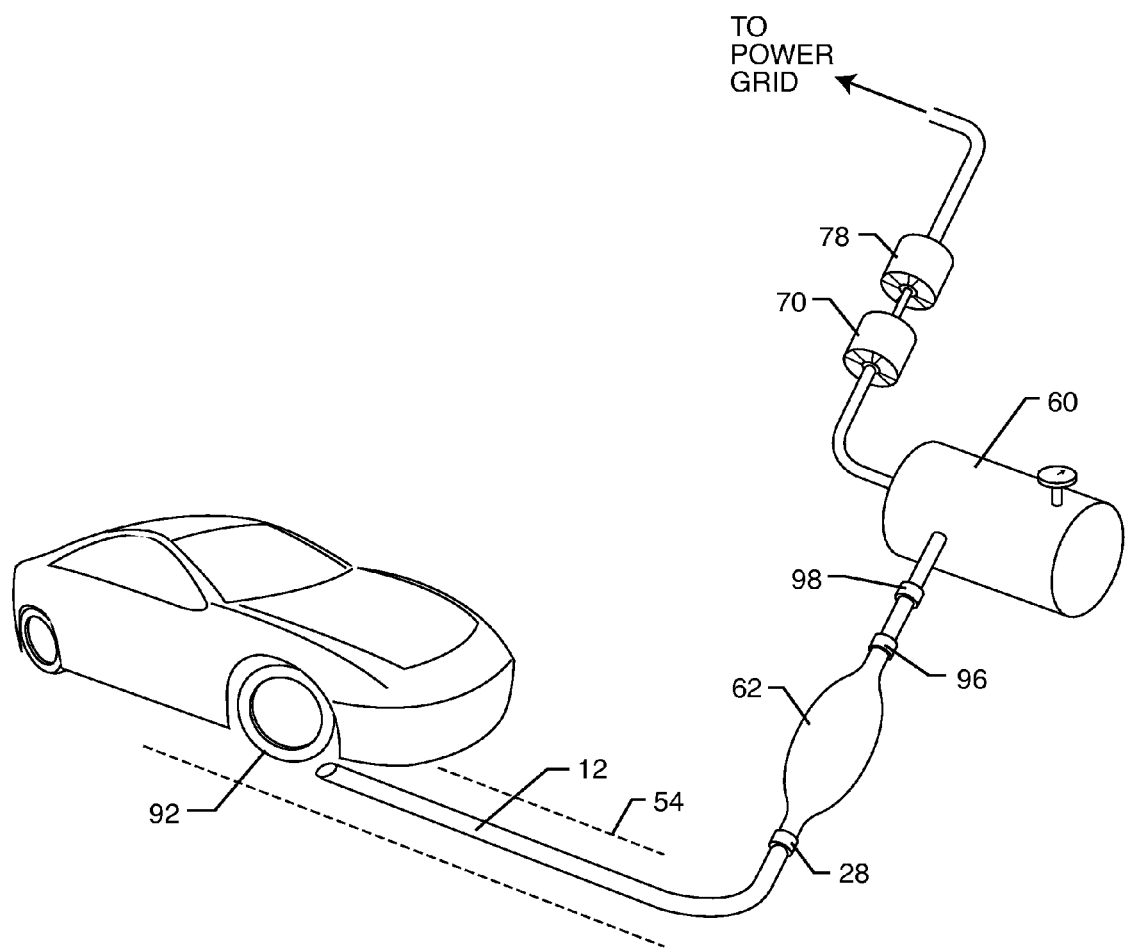
FIG. 10 is an alternative schematic view of FIG. 9, illustrating use of the fluid-based energy generation system with an air bladder and an air pressure amplifier.

FIGS. 10-13 illustrate alternative views of the fluid-based energy generation system 10 as previously discussed with respect to FIGS. 7-9. In FIG. 10, the tire 92 is shown rolling along the roadway 54 and generally compressing the elongated bladder 12 along its way. Preferably, the bladder 12 is made from rubber and filled with ambient air. Once the tire 92 rolls over the bladder 12, additional air is input into the bladder 12 through an open end, and preferably through the input line 20 and the inlet check valve 22 (not shown). Compression of the bladder 12 by the tire 92 generates peristaltically compressed air flow toward the outlet check valve 28 and into the air bladder 62. In this embodiment, compressed air within the air bladder 62 passes through an air pressure amplifier 96 for passage through a one-way air valve 98 into the compressed air tank 60. Compressed air within the tank 60 is then used to drive the pneumatic motor 70 and the permanent magnet alternator 78, in accordance with the embodiments described above.

Additionally, FIG. 11 is a side view of the tire 92 rolling along and compressing the elongated bladder 12. As shown, the tire 92 causes an increased pressure at the point directly in front of the tire 92 such that air flows through the outlet check valve 28 and into the air bladder 62. FIG. 12 more specifically shows that the weight of the vehicle completely compresses that elongated bladder 12 under the tire 92. Preferably, the inside walls of the bladder 12 are lined with plasma or a material that tends to ensure an airtight seal to prevent back-flow of compressed air.

Moreover, FIG. 13 illustrates an embodiment utilizing a roller 100 to provide better compression of the bladder 12 underneath the tire 92. Atmospheric air enters the bladder 12 through an open end of the bladder 12, while compressed air exits the bladder 12 at the opposite end. In this particular embodiment, the roller 100 provides additional pinpoint pressure along the length and width of the bladder 12 while the tire 92 travels there along. The roller 100 is used to squeeze the bladder 12 evenly and to prevent back-flow of the compressed air within the bladder 12. Of course, the roller 100 could apply pressure to multiple bladders 12 in parallel. The use of the roller 100 can also increase the pressure by forming a better airtight seal as the tire 92 rolls along the length of the bladder 12. An air pressure amplifier 96, such as the one described with respect to FIG. 10, could also be used between the bladder 12 and any air pressure tank where the compressed air is stored. Alternatively, the roller 100 may be designed to help maintain a steady flow of pressure within the system 10.

FIG. 14 illustrates another alternative embodiment of the fluid-based energy generation system 10 as disclosed herein. In this embodiment, the vehicle 56 is illustrated driving over a panelized array 101 of an array of the bladders 12 disposed within. Here, the bladders 12 are disposed between two sections of the panelized array 101, a top layer 102 and a ground layer 104. A plurality of springs 106 bias the top layer 102 apart from the ground layer 104 when no point pressure is applied to the top layer 102. This allows the bladders 12 to remained filled (or to fill if previously compressed) with the working fluid 18 (not numbered in FIG. 14). The bladders 12 are as shown in FIG. 14 along the directional movement of the vehicle 56 to facilitate peristaltic-type compression and expansion cycles. Extensions of the bladders 12 run off the side of the panelized array 101 to the inverter 50 described above. In alternative configurations, the bladders 12 may be positioned at nearly any angle relative to the direction of traffic flow of the vehicle 56, and not just parallel. Although, parallel placement is preferred so that the system 10 most efficiently operates peristaltic-compression and expansion cycles of the bladders 12. The weight of the vehicle 56 compresses the springs 106 and the corresponding bladders 12 as the vehicle 56 passes over the select piece of roadway 54 incorporating the fluid-based energy generation system 10.

FIG. 15 is a cross-sectional view of a portion of the panelized array 101 having the bladder 12 positioned between the top layer 102 and the bottom layer 104 by the simple springs 106. Here, the bladder 12 is a substantially cylindrical tube that resides within a channel 108 formed from a portion of the ground layer 104. This ensures that the bladder 12 does not move side-to-side or shift (e.g. by rolling) when inflated. This configuration also ensures that the bladders 12 receive the most efficient compression. For example, the panelized array 101 is able to provide airtight compression along the length of the bladder 12 as the vehicle 56 travels over the top layer 102 of the panelized array 101. The channel 108 also provides a point for compression. For example, the top layer 102 may be keyed with an extension 110 that matches the channel 108 such that the system 10 attains maximum compression of the bladder 12 when a point load is applied thereto.

The directional arrows shown in FIG. 16 illustrate the weight of the vehicle 56 as it travels over the top layer 102 of the roadway 54. Here, the weight of the vehicle 56 causes the springs 106 to depress downwardly such that the top layer 102 is depressed into the ground layer 104. As such, the extension 110 compresses the bladder 12 into the keyed channel 108 to attain maximum and complete compression of the bladder 12. Any fluid in the bladder 12 (e.g. the working fluid 18 described with respect to the embodiments above) is forced out of the bladders 12, through the exit line 26 and the outlet check valve 28 into the compressed air tank 60 or the reserve compressed air tank 68. As shown in FIG. 14, the compressed air tank 60 may be coupled to multiple bladders 12. Additionally, the compressed air tank 60 may also be included and used in parallel or series with the reserve compressed air tank 68 to ensure consistent output to the low pressure pneumatic air motor 70. Accordingly, the compressed air in the air tank 60 is delivered to the low pressure pneumatic air motor 70 through a pneumatic motor input line 116. The low pressure pneumatic air motor 70, in this embodiment, operates as describe with respect to FIGS. 7-8 or the set of gears/pulleys 76, as described above, to generate usable electricity.

Alternatively, the bladders 12 of FIG. 14 may be deployed in an environment that requires the use of speed bumps. For example, the top layer 102 of the roadway 54 illustrated in FIG. 14 could be removed, thereby exposing the bladders 12 to direct pressure from the tires 92 of the vehicle 56. In this embodiment, only one bladder 12 would need to be deployed as the speed bump. The tires 92 travel over the bladders 12 to distribute a load to the top of the bladders 12. The inlet check valve 22 would prevent air from being compressed out back into the atmosphere. Upon compression of one or more of the bladders 12, compressed air exits the bladders 12 through the exit line 26 and into the compressed air tank 60 or the reserved compressed air tank 68. The outlet check valve 28 ensures that the compressed air or fluid does not return to the bladders 12 through the exit line 26. Once the load is removed from the bladder 12, additional air is drawn into the input line 20 through the inlet check valve 22 from the atmosphere. The bladders 12 re-inflate in anticipation of the next set of vehicle tires 92 traveling thereover to repeat the cycle.

In general, in the embodiments described above with respect to FIGS. 7-16, a force exerted by a point load and/or pressure compresses a volume of air (or other fluid) within the bladder 12. The compressed air is channeled into the compressed air tank 60 within the required pressure range to run the pneumatic type air motor 70. The pneumatic air motor 70 turns the permanent magnet alternator 78 to generate electrical power. Once the point load and/or pressure compresses the volume of air to its fullest extent, a simple spring (FIGS. 14-16) or the memory of the bladder material returns the system 10 back to its normal position by drawing air (or another fluid such as water) in (e.g. from the atmosphere) through the input lines 20 to replenish the volume of air (or another fluid) within the bladder 12. This describes one "cycle" of the system 10. Once the bladder 12 is back to its original shape, position and volume, the system 10 is ready for another "cycle". The embodiments described herein can be used in roadways, as described above, or other locations where vehicles pass over. Each set of wheels provides a point load/pressure to compress the air in the tubes. This application would work well on public roads, driveways, private parking lots, near tollbooths, used instead of or concurrently with speed bumps or "be alert pads" in the path of a moving vehicle. There are endless ways to utilize the system 10, not just with cars/trucks, but with buses, construction vehicles, trains, airplanes, etc.

Figure 17:
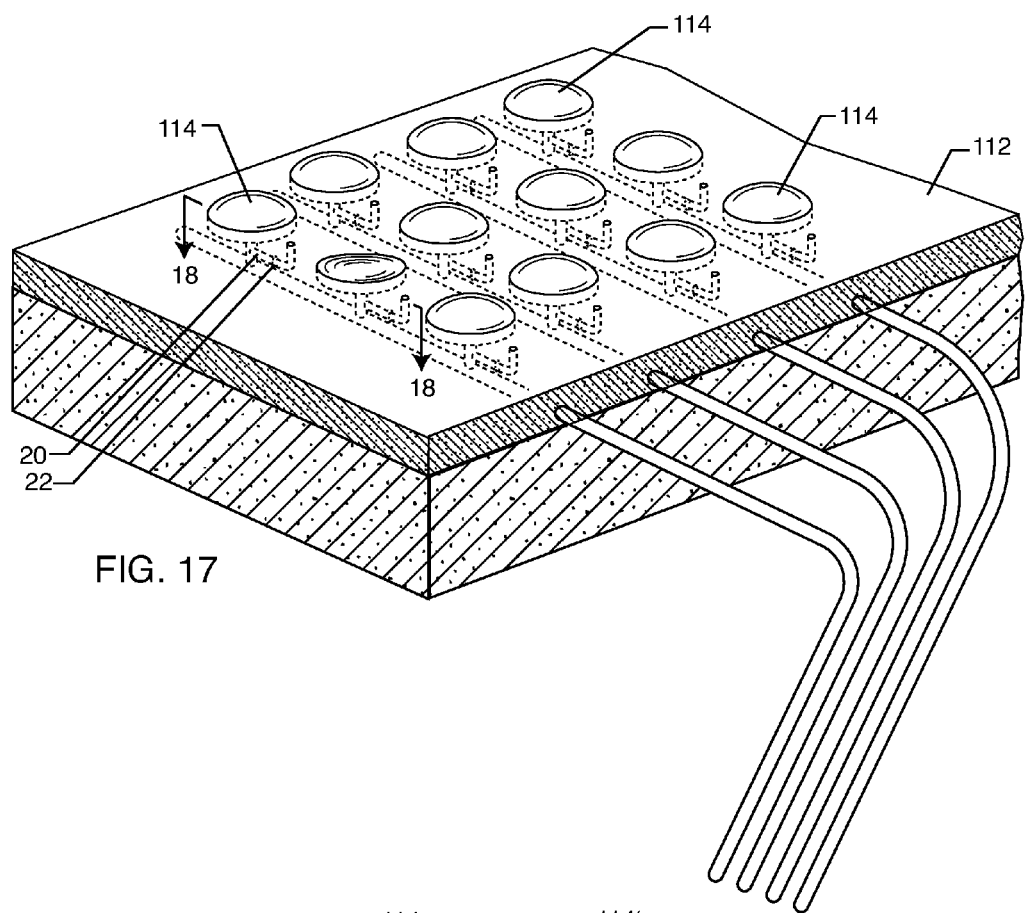
FIG. 17 is an environmental partial-cutaway view illustrating deployment of the fluid-based energy generation system in a sidewalk.
Figure 18:
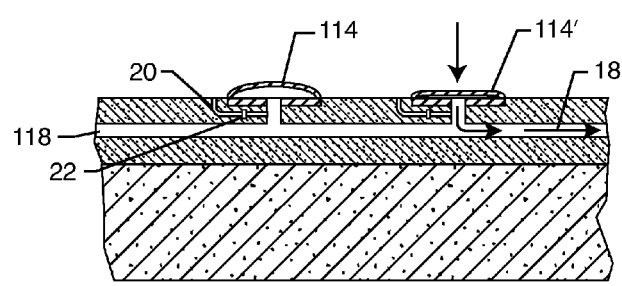
FIG. 18 is a cross-sectional view of the sidewalk of FIG. 17, taken about the line 18-18.

Furthermore, the embodiment described with respect to FIGS. 14-16 may be deployed in virtually any environment that experiences a point pressure—such a sidewalk 112 shown in FIGS. 17-18. Here, a plurality of inflated pods 114 are disposed along a sidewalk or other path. The pods 114 are preferably made from a flexible material that compresses, like the bladders 12, under a point pressure—such as when a person steps on one of the pods 114 or as a bicyclist rides over one or more of the pods 114. The working fluid 18 (FIG. 17) within the pods 114 is compressed out from within when pressure is applied thereto. Pressurized fluid exits the pod 114 and enters a set of piping 118 or other tubing that directs the pressurized fluid to the aforementioned charging station (e.g. through the exit line 26 and the outlet check valve 28). FIG. 18 illustrates compression of one of the pods 114' relative to its uncompressed state 114. Here, the working fluid 18 is compressed out from within the pod 114' as shown by the directional arrow therein. The pressurized working fluid 18 travels through the piping 118 for eventual delivery to the compressed air tank 60 or for use in generating electricity. The pods 114 inflate by drawing in atmospheric air through the input lines 20 and the inlet check valves 22. As such, a pedestrian, bicyclist, or other intermittently applied mass can generate energy by depressing the "bubble-like" pods 114 within the sidewalk 112. This enables the use of the same energy harnessing principles described above to be applied to smaller motions.

Figure 19:
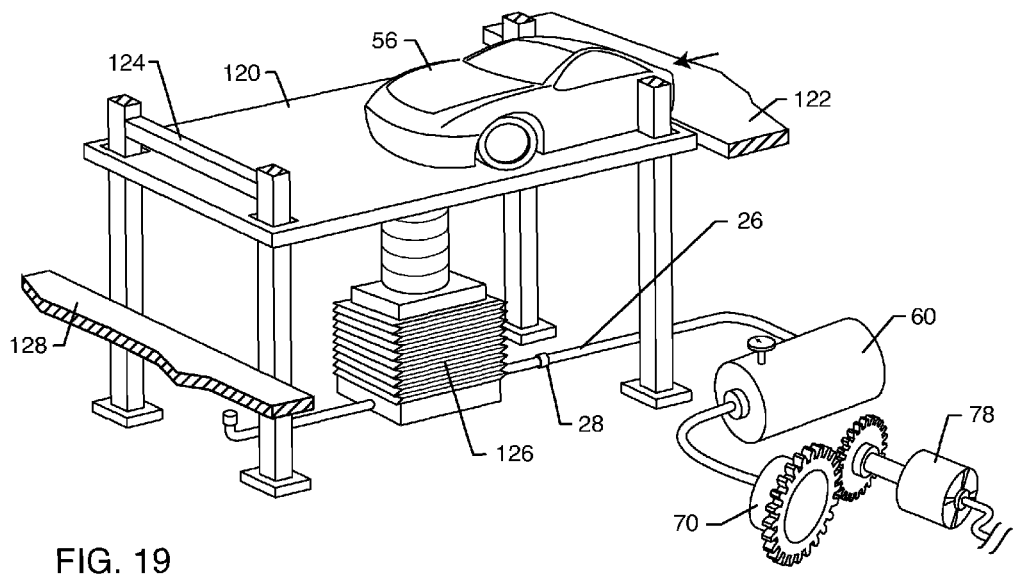
FIG. 19 is a schematic view illustrating the fluid-based energy generation system incorporated into a vehicle parking space.

FIG. 19 illustrates a specific embodiment of the "platform press" concept of the fluid-based energy generation system 10. This embodiment provides an example of harnessing energy in a parking structure. For instance, the vehicle 56 drives up onto a platform 120 elevated in a portion of the parking garage. The platform 120 is, at least initially, flush with a first level 122 of the parking lot. The platform 120 includes a barrier 124 to prevent the vehicle 56 from driving too far over the platform 120 when the platform 120 is at the height of the first level 122. The weight of the vehicle exerts a load on a large volume air bladder 126. The large volume air bladder 126 functions similar to the bladder 12 described with respect to the embodiments above. That is, the vehicle 56 exerts a point load on the top of the large volume air bladder 126 to push air out through the exit line 26. The air or fluid in the exit line 26 travels through the one-way outlet check valve 28 and into the compressed air tank 60. Compressed air within the tank 60 is then used in accordance with the embodiments described with respect to the low pressure pneumatic motor 70 and the low rpm permanent magnet alternator 78. Since the vehicle 56 compresses the large volume air bladder 126, the vehicle 56 is no longer able to exit on the first level 122. Accordingly, a second barrier (not shown) may prevent the vehicle 56 from backing up in an attempt to leave via the first level 122. In a similar instance, the barrier 124 is removed from the front portion of the vehicle 56 to allow the driver to exit the parking garage at a second level 128, which is comparatively lower than the first level 122. Once the vehicle 56 is removed from the platform 120, the large volume air bladder 126 re-fills with atmospheric air through the input line 20 and the inlet check valve 22 in accordance with the embodiments described above. The platform 120 returns to its original position with the help of a simple spring or other device to aid in the expansion of the large volume air bladder 126.

Figure 20:
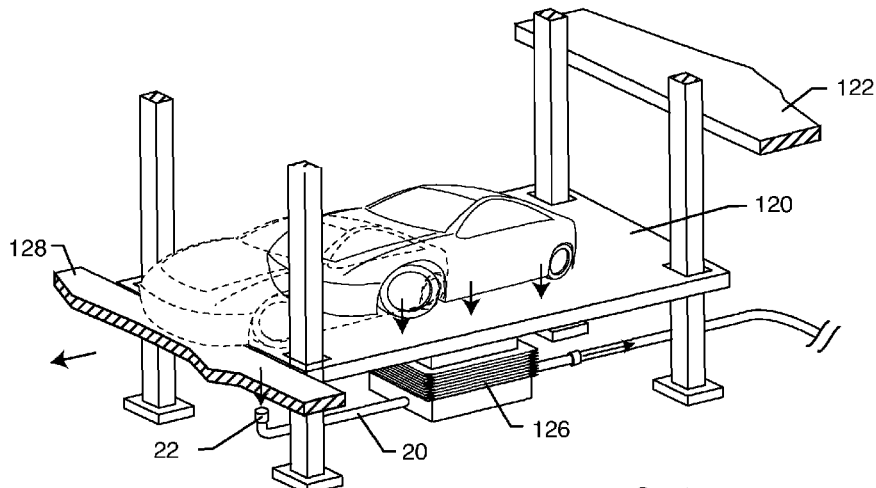
FIG. 20 is a schematic view similar to FIG. 19, illustrating the system in a compressed state.
Figure 21:
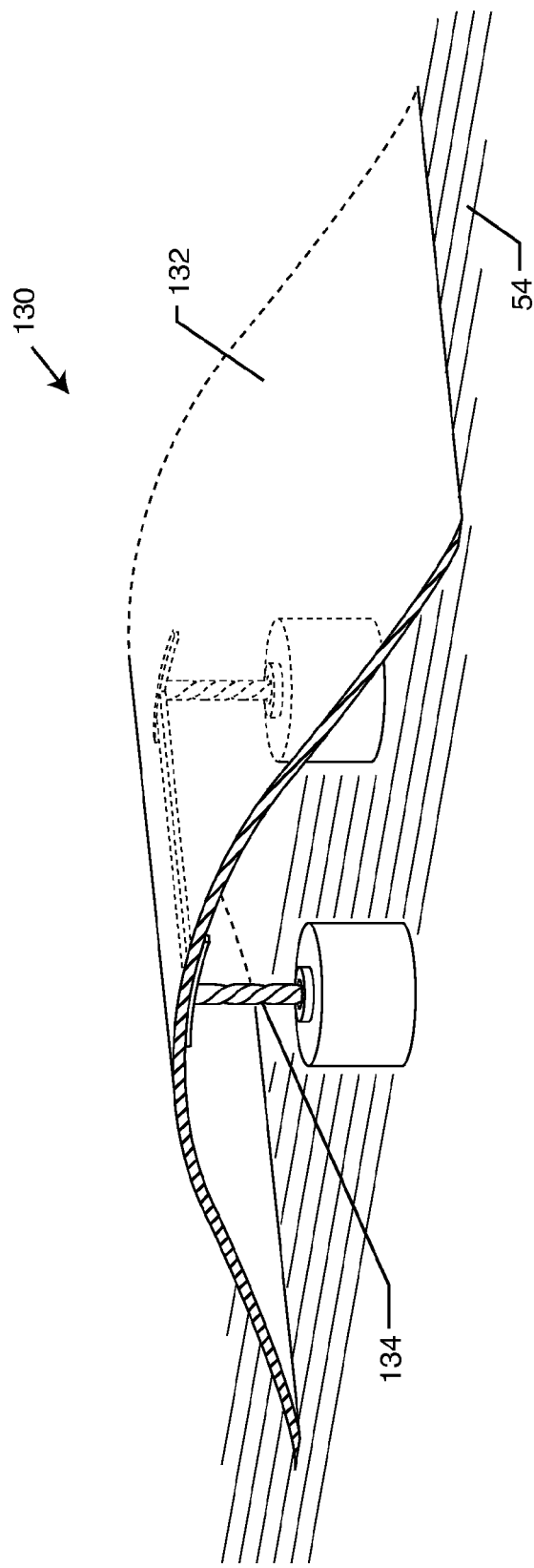
FIG. 21 is an environmental view illustrating a load-based energy generation system utilizing a pair of generators disposed underneath a compressible section of roadway.
Figure 22:
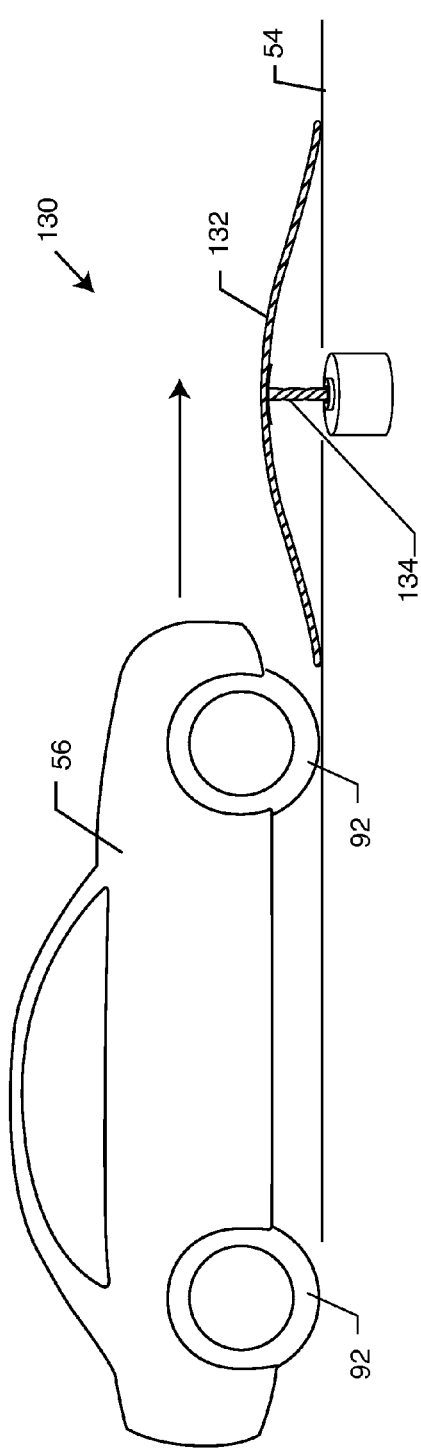
FIG. 22 is a side view illustrating a vehicle approaching the energy generation system of FIG. 22.
Figure 23:
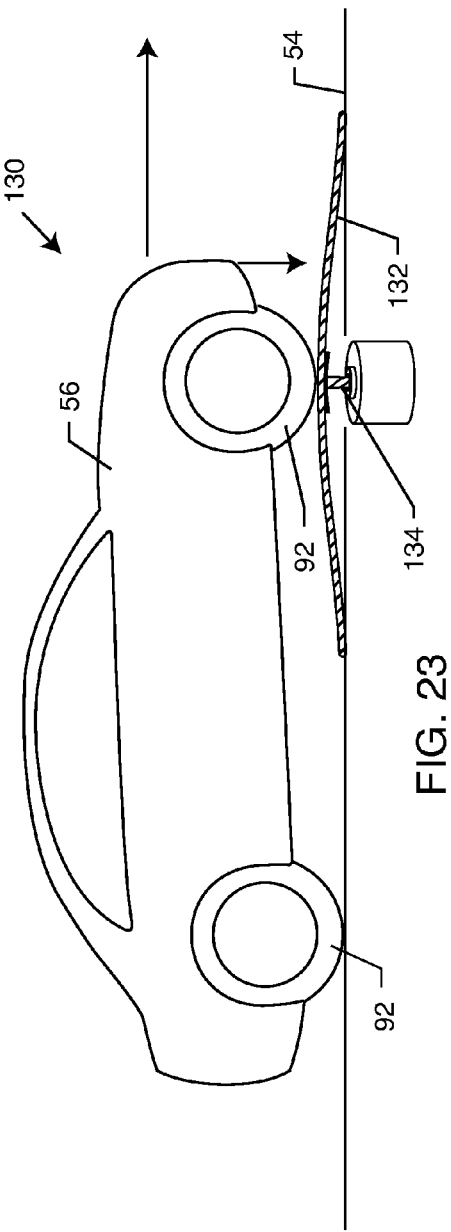
FIG. 23 is a side view similar to FIG. 22, illustrating compression of the roadway by the vehicle.

FIGS. 21-23 illustrate a mechanical load-based energy generation system 130. This embodiment harnesses electrical energy in a similar manner as does the fluid-based energy generation system 10 shown with respect to FIGS. 1-20. In FIGS. 21-23, the tires 92 of the vehicle 56 roll up onto a mechanical platform 132. The mechanical platform 132 may function similar to a speed bump, or may be more generally incorporated into the roadway 54 in the form of a rolling incline or other minor disturbance in the otherwise planar roadway. As such, the structure of the mechanical platform 132 is exaggerated for illustration purposes. In this embodiment, the tires 92 depress the mechanical platform 132, which causes rotation of a corkscrew driveshaft 134 to generate electricity.

Figures 24, 25:
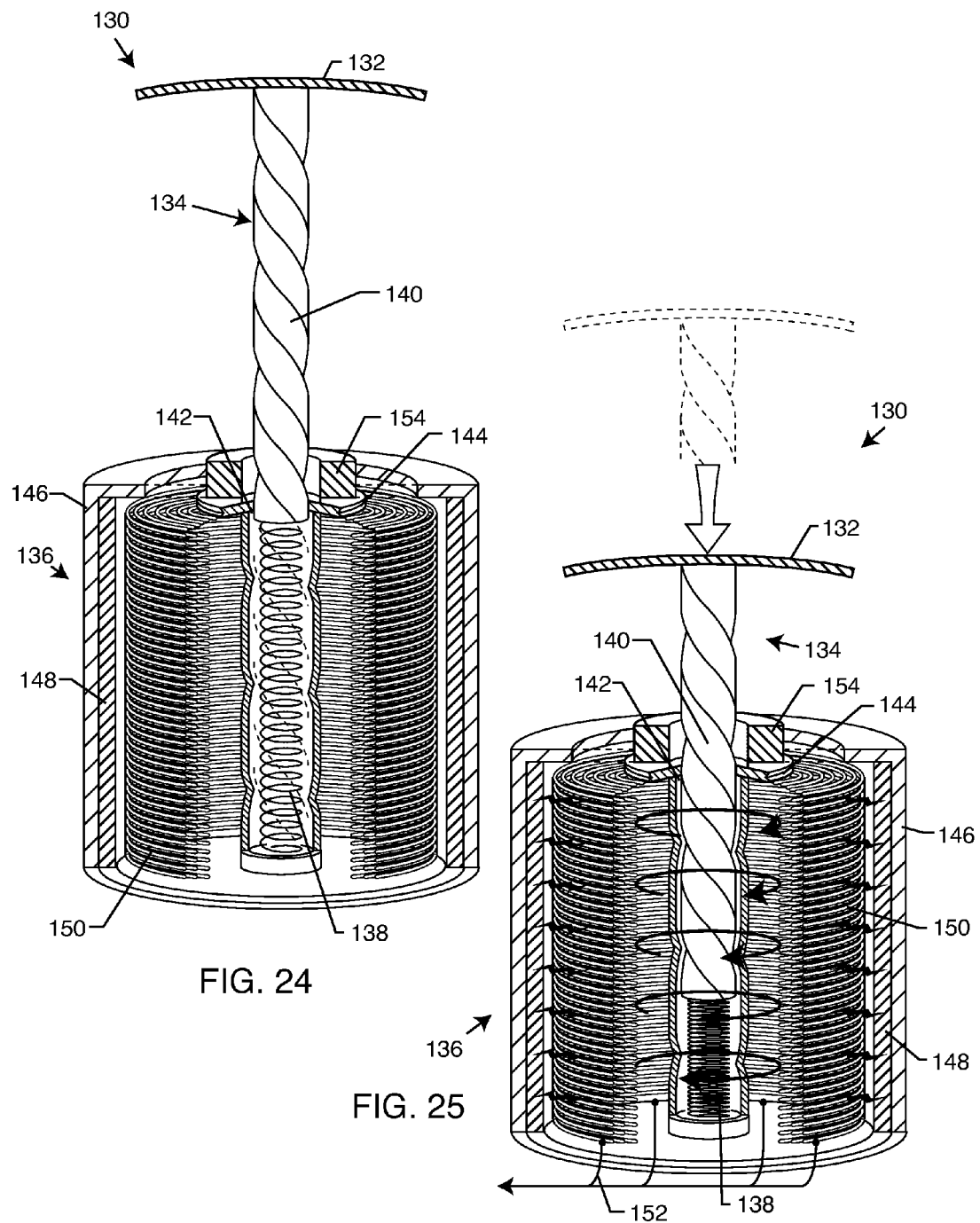
FIG. 24 is a partial-cutaway perspective view of the generator shown in FIGS. 21-23.
FIG. 25 is a partial-cutaway perspective view similar to FIG. 24, illustrating activation of the generator through downward movement of a corkscrew driveshaft.

FIGS. 24 and 25 illustrate the operation of one embodiment of the mechanical load-based energy generation system 130 in the form of a generator 136. Here, the corkscrew driveshaft 134 is in an initial or extended position extending out from the generator 136 (corresponding to the position shown in FIG. 22). The driveshaft 134 is biased upwardly by a return spring 138 disposed concentrically within the interior of the generator 136. This maintains the platform 132, when no weight or pressure is applied thereto, in the position shown in FIG. 22. The driveshaft 134 includes a plurality of threads 140 that matingly engage a threaded chamber 142 within the interior of a collar 144. The driveshaft 134 travels downwardly through the collar 144 when a force or pressure is applied to the platform 132 that exceeds the resistive forces of the return spring 138. Threaded engagement of the threads 140 with the threaded chamber 142 of the collar 144 causes an exterior housing 146 of the generator 136 to rotate concentrically about the corkscrew driveshaft 134. A permanent magnet 148 is fixedly mounted to the interior of the housing 146 and rotates therewith. The permanent magnet 148 surrounds a plurality of electrically conducting coils 150. A set of lead wires 152 attach to the ends of the conducting coils 150 and are preferably electrically coupled to a capacitor (not shown in FIGS. 24-25).

Energy is generated in the embodiment shown in FIGS. 24-25 by driving the vehicle 56 over the mechanical platform 132. The weight of the vehicle 56 depresses the driveshaft 134, along the directional arrow shown in FIG. 24, into the center of the generator 136. As such, the threads 140 from the driveshaft 134 pass through the threaded chamber 142 in the collar 144 causing the collar 144 to rotate relative to the driveshaft 134 and the coils 150. The collar 144 is fixedly coupled to the housing 146 and the attached permanent magnet 148, which spin therewith. The generator 136 reaches is maximum potential to generate energy in one "cycle" when the vehicle 56 reaches the position shown generally in FIG. 22 (or when the driveshaft 134 has been fully depressed into the generator 136). When the force is removed from the mechanical platform 132, the return spring 138, preferably a coil spring, returns the driveshaft 134 to the original resting position shown in FIGS. 22 and 24. A stop collar 154 prevents the collar 144 from rising up when the driveshaft 134 returns to the FIG. 24 position. Meanwhile, the housing 146 and the attached permanent magnet 148 continue to spin. Electrical energy is captured by the coils 150 as the permanent magnet 148 spins thereabout. Electrical energy may be harvested as long as the magnet is spinning, which may even occur after the vehicle 56 passes over the mechanical platform 132 and the corkscrew driveshaft 134 returns back to its normal resting position. The spinning housing 146 and permanent magnetic 148 eventually slow down and come to rest, unless another vehicle 56 passes over. Depending upon the design of the system 130, either direct current ("DC") or alternating current ("AC") may be generated. The resulting electrical energy may either be stored directly in a battery or capacitive device, or the energy may pass through an AC to DC converter, such as a commonly used rectifier circuit, and then to a rechargeable battery.

Figure 26:
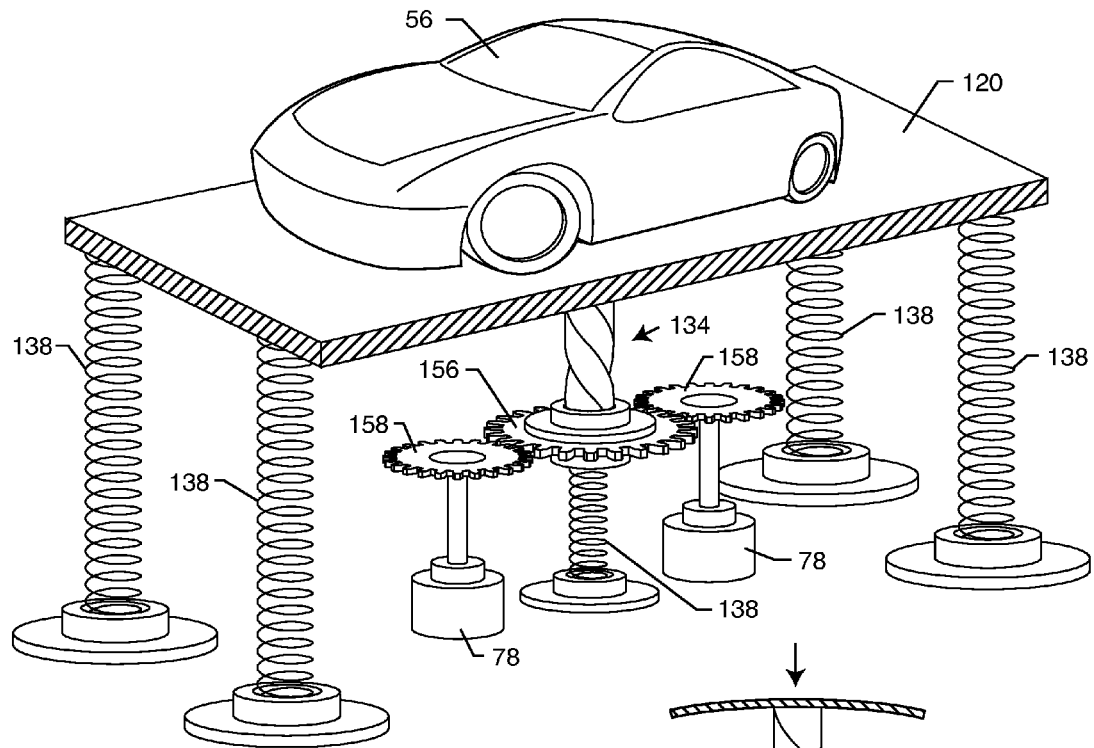
FIG. 26 is an alternative environmental view of FIG. 19, illustrating use of a corkscrew-type mechanism that rotationally operates one or more alternators to generate electricity.
Figure 27:
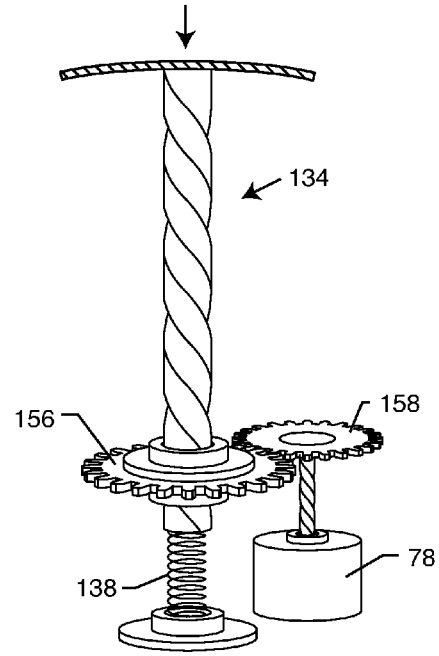
FIG. 27 is an enlarged perspective view of the system of FIG. 26, illustrating operation of the driveshaft in association with the alternators to generate electricity.

FIGS. 26-27 operate under a similar premise as does the operation of the system 10 in FIGS. 19-20, but with a mechanical load-based energy system 130 instead. In this case, the vehicle 56 drives onto the platform 120 to provide a point load along the corkscrew driveshaft 134. The driveshaft 134 is rotationally coupled with a drive gear 156, which is coupled to a pair of alternator gears 158. The return springs 138 bias the driveshaft 134 upwardly when the no point pressure or weight is placed on the platform 120. At this point, the platform 120 is positioned at the surface of the first level (e.g. the first level 120 shown in FIG. 19), which allows the vehicle 56 to drive on to the platform 120. When the vehicle 56 drives on to the platform 120, the weight of the vehicle 56 depresses the return springs 138. The corkscrew driveshaft 134, being fixedly coupled underneath the platform 120, descends through the drive gear 156. The corkscrew driveshaft 134 causes the drive gear 156 to rotate as a result of being threadingly coupled thereto. Rotational movement of the drive gear 156 causes associated rotational movement of the alternator gears 158, and the generation of electricity in the magnetic alternators 78. The vehicle 56 is then able to offload from the platform 120 when reaching a lower second level (e.g. the second level 128 shown in FIG. 19). The return springs 138 then bias the platform 120 upwardly to the position generally shown in FIG. 26; and in a position to receive another vehicle 56.

Figure 28:
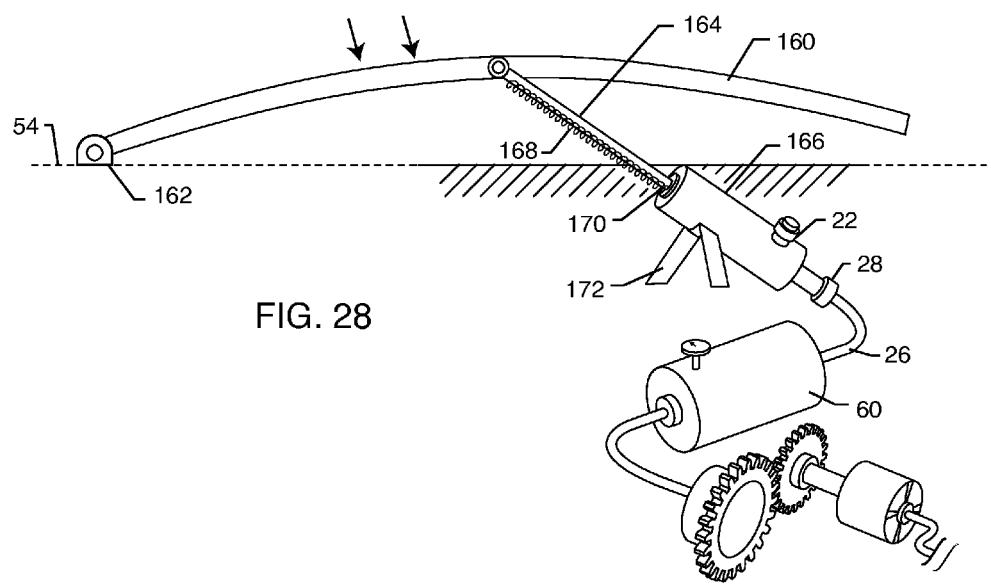
FIG. 28 is a partial-cutaway schematic view illustrating an alternative embodiment of the fluid-based energy generation system, utilizing a depression plate and piston combination.

FIG. 28 illustrates another alternative embodiment of the fluid-based energy generation system 10 used in conjunction with a depression plate 160 disposed along the roadway 54. The depression plate 160 pivots about a hinge 162 upon application or removal of a point load (e.g. the vehicle 56 or a person). Weight or pressure exerted to the surface of the depression plate 160 (as designated by the directional arrows therein) causes depression of a piston 164 coupled thereto. The piston 164 is coupled to an air compressor 166 for compressing the air therein. Air is drawn into the air compressor 166 through the one-way inlet check valve 22. Air compressed within the air compressor 166 is expelled therefrom through the one-way outlet check valve 28 and through the exit line 26 for storage in either the compressed air tank 60 or the reserved compressed air tank 68 (not shown in FIG. 28). A spring 168 is positioned along the length of the piston 164 between the depression plate 160 and a front surface 170 of the air compressor 166. The spring 168 compresses when a load is exerted on the depression plate 160. This allows the piston 164 to insert into the air compressor 166 and allows the depression plate 160 to pivot about the hinge 162. The air compressor 166 is balanced on a brace 172 or other support, which may allow the air compressor 166 to move as necessary. In one embodiment, the piston 164/air compressor 166 combination are positioned underground. Accordingly, the brace 172 is also underground and preferably placed in a chamber that permits the air compressor 166 to pivot or rotate to accommodate movement of the depression plate 160 and the piston 164. Once the load is removed from the depression plate 160, the spring 168, disposed between the inside surface of the depression plate 160 and the front surface 170 of the air compressor 166, returns the depression plate 160 and the piston 164 back to an initial position for capturing energy from the next load passing thereover. Accordingly, when the piston 164 is removed out from within the interior of the air compressor 166, additional atmospheric air is drawn in through the one-way inlet check valve 22, as described in accordance with the embodiments above.

Figure 29:
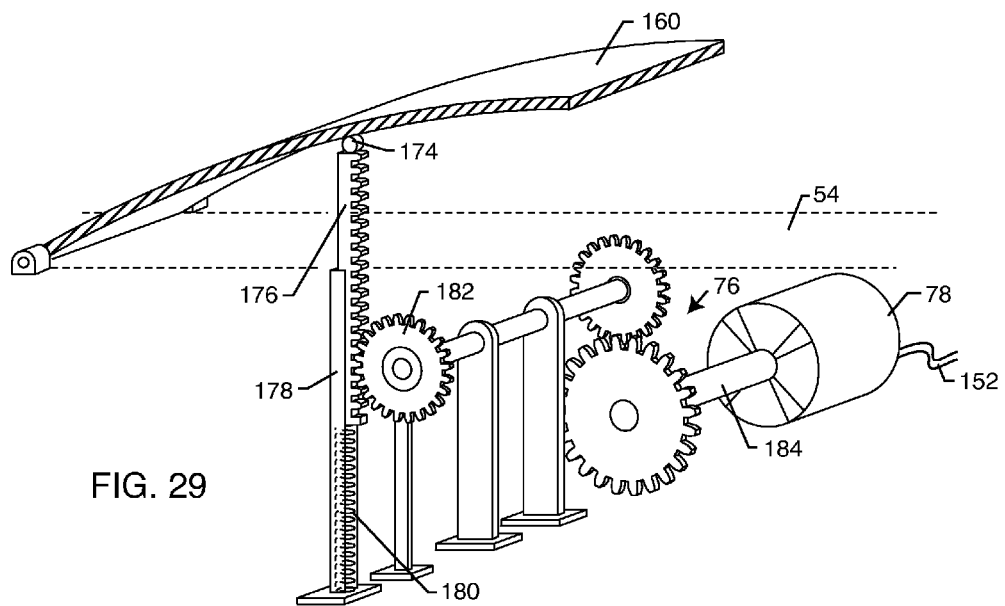
FIG. 29 is an alternative embodiment of the load-based energy generation system, illustrating the depression plate coupled to a rack and pinion gear set that drives an alternator to generate electricity.

FIG. 29 is an alternative embodiment for using the depression plate 160 as described with respect to FIG. 28. In FIG. 29, the depression plate 160 preferably pivots about one or more of the hinges 162 coupled to the roadway 54. In this embodiment, the depression plate 160 sits atop a rolling pin 174 coupled to a gear rack 176. The gear rack 176 resides within a support track 178 and is generally biased upwardly by a coil spring 180. Applying a load atop of the depression plate 160, by any of the means described above, causes the gear rack 176 to compress the coil spring 180. The rolling pin 174 ensures that the depression plate 160 is able to continually depress the gear rack 176 as the interior surface of the depression plate 160 moves relative to the top of the gear rack 176. The gear rack 176 engages and turns the teeth of a pinion gear 182 upon depression thereof from a load exerted to the depression plate 160. The pinion gear 182 is axially coupled to and turns the gears/pulleys 76 to drive a shaft 184 of the alternator 78. Rotation of the shaft 184 by the gears 76 enables the alternator 78 to generate electrical energy, which is supplied to a power grid or battery by the electrical lead wires 152.

Figure 30:
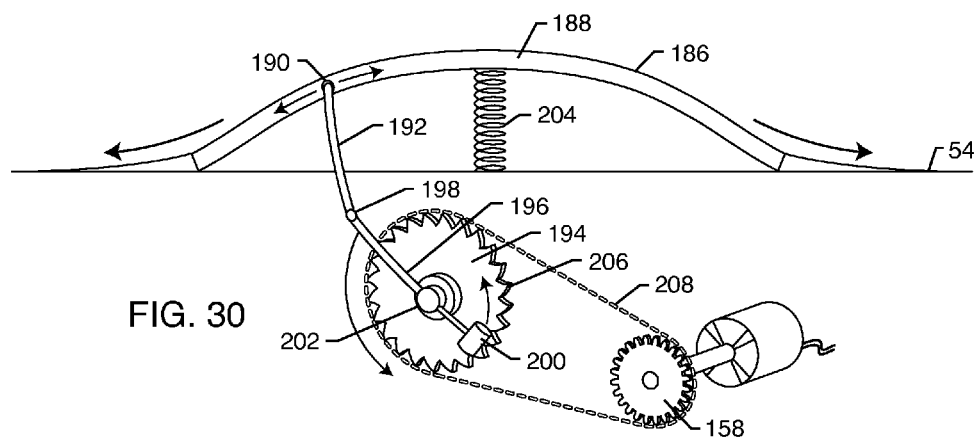
FIG. 30 is a schematic view of an alternative load-based energy generation system, illustrating a depressible material coupled to a shaft for driving an alternator.

FIG. 30 illustrates another alternative embodiment that incorporates the use of a depressible material 186 to harness energy in accordance with the principles described herein. In this embodiment, a roller shaft 188 is integrated into the depressible material 186 to provide a space for a roller 190 to move within. The roller 190 is coupled to a drive shaft 192 which is, in turn, coupled to a gear/sprocket 194 via a second drive shaft 196 coupled thereto by a pivot 198. The second drive shaft 192 couples to a counter-weight 200 about a second pivot 202. The embodiment described with respect to FIG. 30 operates by applying a load to the top surface of the depressible material 186. The depressible material 186 may slide from right to left along the directional arrows shown along the surface of the roadway 54, for example. This allows the depressible material 186 to compress a coil spring 204. The coil spring 204 returns the depressible material 186 back to a preferred shape or form once the external load is removed therefrom. Additionally, depression of the depressible material 186 requires movement of the roller 190 within the interior of the roller shaft 188 to accommodate movement of the drive shaft 192. This causes pivotal rotation of the second drive shaft 196, which rotates the counter-weight 200. The counter-weight 200 is designed to continue rotation of the gear/sprocket 194. A set of teeth 206 of the gear/sprocket 194 engage a chain 208. The chain 208 has a set of pockets therein (not shown) that receive the teeth 206. Rotation of the gear/sprocket 194 causes rotation of the alternator gears 158. The teeth 206 and the chain 208 may, in one embodiment, be constructed similar to that of a gear and chain set commonly found with a bike or other similar device.

Figure 31:
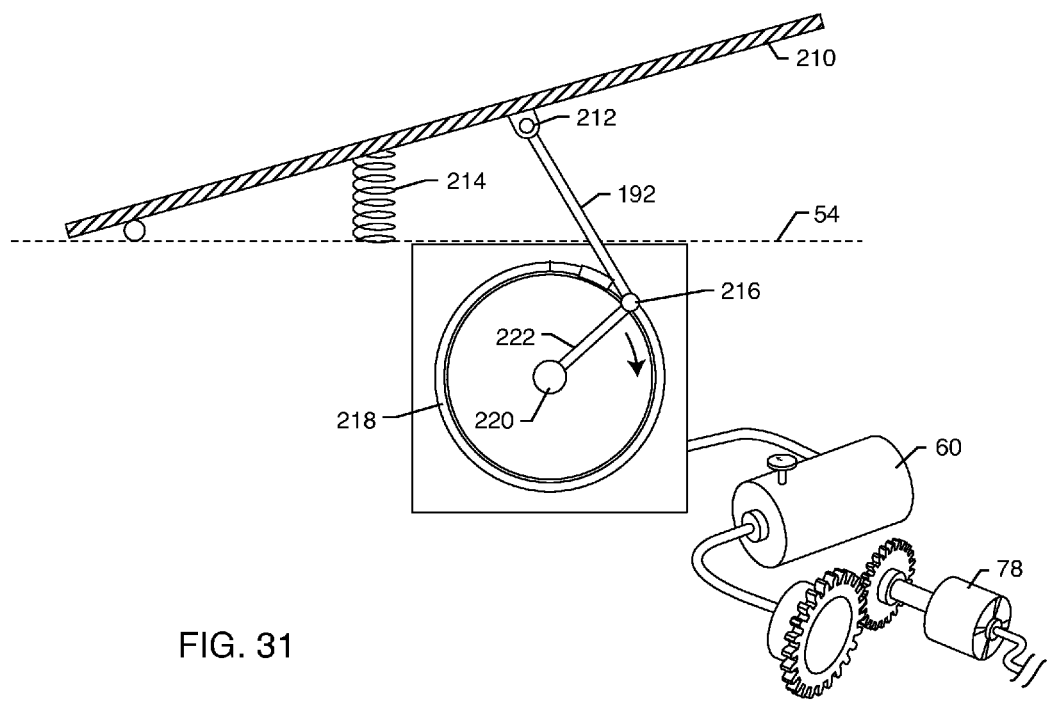
FIG. 31 is a partial-cutaway schematic view illustrating another alternative load-based energy generation system, utilizing a compressible lever coupled to a drive shaft for compressing a fluid in a peristaltic-type manner.

FIG. 31 illustrates another embodiment of the fluid-based energy generation system 10. This embodiment includes a lever 210 extending upwardly from a surface, such as the roadway 54. The lever 210 connects to the drive shaft 192 via a pivot 212. The lever 210 is biased upwardly in the position shown in FIG. 31 by a coil spring 214. Placement of a load, such as a vehicle driving over the roadway 54, causes compression of the lever 210 against the spring 214. As such, the drive shaft 192 moves downwardly and rotates about the pivot 212. A compression roller 216 travels along a portion of a hose 218 housing a fluid, such as air or water. The fluid within the hose 218 is compressed by the compression roller 216 as it passes thereover. Compressed fluid exits the hose 218 through a one-way check valve and into the compressed air tank 60 in accordance with the embodiments described herein. Additional fluid (e.g. air) enters the hose 218 so the process can be repeated. The compression roller 216 rotates around an axel 220 and is generally connected thereto via a linkage 222. The pressure within the hose 218 builds up and is utilized to turn the permanent magnet alternator 78 to capture electrical energy. This is one of several ways to transfer the energy within lateral/downward motion of an object into a circular rotational device that is used to work a peristaltic-type motion, for example with liquid or gas. As such, the system 10 is able to turn the permanent magnet alternator 78 and capture the energy as electrical energy.

Figure 32:
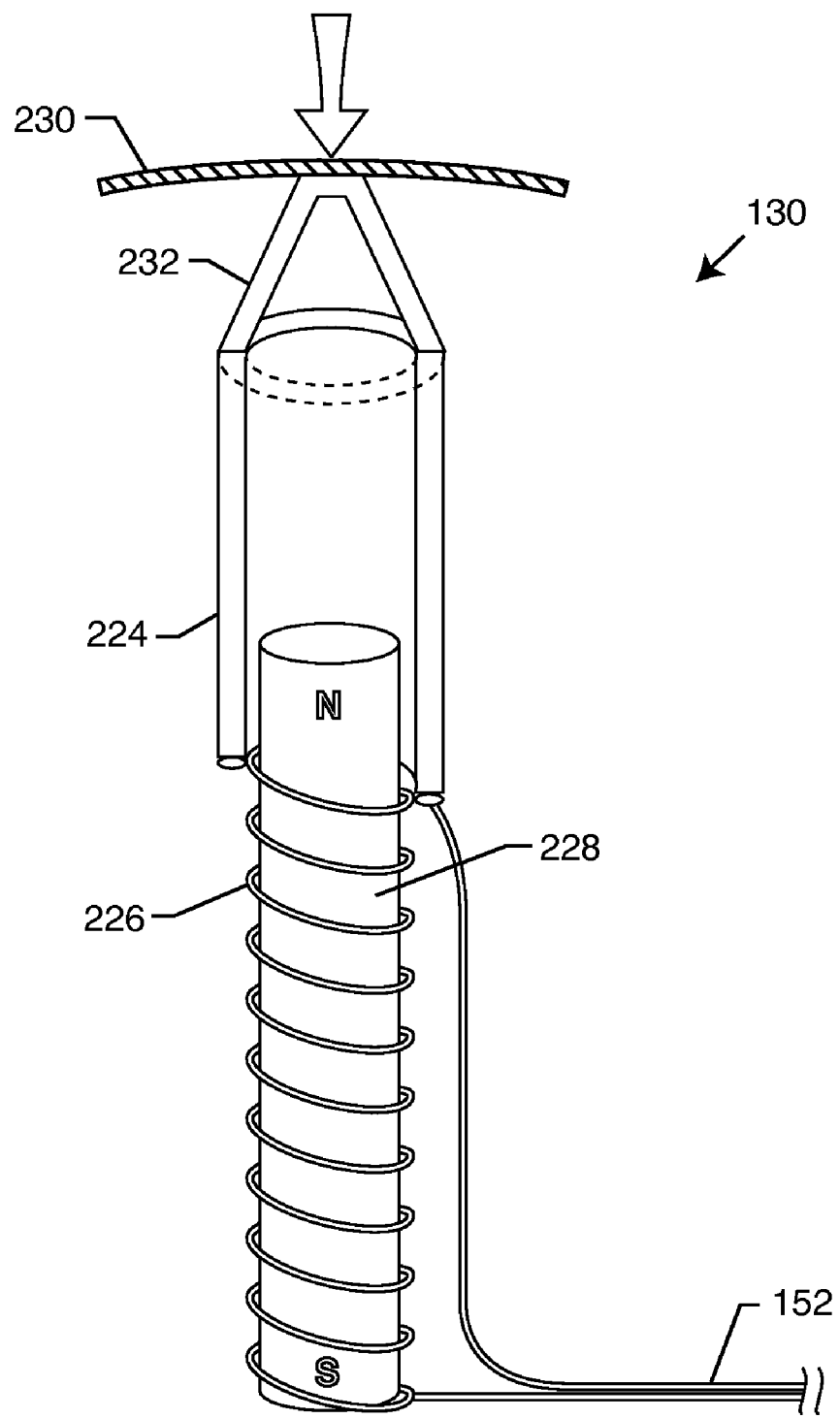
FIG. 32 is a diagrammatic view of an alternative load-based energy generation system incorporating a spring that traverses a magnet to generate electricity when a load or pressure is applied to a top plate.

Lastly, FIG. 32 illustrates another alternative embodiment of a load-based energy generation system 130. This system 130 includes a hollow cylinder 224 attached to a coil spring 226 that traverses the length of a permanent magnet 228 in response to a load or force applied to a top plate 230. The top plate 230 could include a depressible portion of a roadway, a speed bump, or other surface area (e.g. a bulkhead) that may experience intermittent pressures or forces thereon. The cylinder 224 preferably fixedly mounts to a brace 232 coupled underneath the top plate 230. The brace 232 may be hollow inside to allow the magnet 228 to pass through. When a force is applied to the top plate 230, such as along the directional arrow shown in FIG. 32, the spring 226 compresses downwardly toward the bottom of the magnet 228. The coil spring 226 traverses the length of the magnet 228. This movement generates electrical current along the coil spring 226 in one direction. After the load is removed from the top plate 230, the coil spring 226 expands, thereby once again traversing the length of the magnet 228 in an opposite direction. Electrical current is then generated along the coil spring 226 in an opposite direction. As a result, this system 130 is able to generate alternating current ("AC"). The AC current may be passed through an AC to DC converter (such as a commonly used rectifier) via the lead wires 152. The resulting DC electrical energy may be stored in a rechargeable battery.

The fluid-based energy generation system 10 and the mechanical load-based energy generation system 130 described herein can be more specifically tailored to meet the needs of any particular application in industry. For instance, if there is an industry or manufacturer that produces point loads or pressures throughout the day in a factory or plant, those point loads/pressure could be used to compress a fluid in the fluid-based energy generation system 10 and/or operate the mechanical load-base energy generation system 130 in one of the above-described applications (or perhaps another type of application). In general, these systems can be used to harvest potential or kinetic energy within specific industries, energy that may be wasted currently, and convert that energy to electrical power by the use of the embodiments described herein.

The embodiments described herein are configured to harness energy from measurable point loads/pressures/vibrations under the weight of vehicles, people, trains, planes, waterways, earthquakes, etc. These systems can use the array of bladders 12 from FIG. 5, the panelized array 101 from FIG. 14, the depression plate 160 or the compressible material 186, which can be installed under or in between pavement layers, concrete slabs, sod or earth, walls, bulkheads, train station platforms, airport tarmacs, storm water culverts, bridges, etc. The intermittent forces exerted on the depression plate 160 or the depressible material 186 cause the system to cycle through compression and release cycles to generate energy.

The systems may vary in size and the amount of energy created or generated per cycle. In some embodiments it may be desirable to experience more traffic, thereby increasing the number of "cycles".

The fluid-based energy generation system 10 may also be used in association with a horizontal "platform press" or vertical "wall press" in which a point load or pressure such as a vehicle or earth/water/wind/sound/vibration pressures (e.g. tides) are temporarily exerted on the system; or versions of the array of bladders 12 in the equipment cabinet 32 or the deployment in association with the roadway 54 or panelized array 101. Such point loads or pressures may be found in vehicle repair lifts, truck stops, weigh stations, staging areas for airplanes in the hanger or airport, public parking lots, staging areas for storage containers near seaports, detention basins filled with water, large walls or bulkheads with surges of earth pressures, wave pressures and/or wind pressures. The force exerted by the point load and/or pressure compresses a volume of fluid within a "bladder", as described above. The compressed fluid fills up a pressure tank within the required pressure range to run a pneumatic-type fluid motor, which turns a permanent magnet alternator, thereby generating electrical power. Once the point load and/or pressure compresses the volume of fluid to its fullest extent, the material's memory or a simple spring returns the horizontal platform or vertical wall back to its normal position while the intake lines draw the fluid from the surrounding atmosphere to replenish the volume of fluid within the "fluid bladder". This would describe one "cycle" of the system and once the "fluid bladder" is back to its original position and fluid volume, it is ready to begin another "cycle". In this general example, large volumes of fluid are compressed or moved under the point load or pressure exerted to allow minimum pressures required to turn the shaft of the permanent magnet alternator in order to generate electrical power. This application is intended for such instances where the point loads or pressures are continually available.

Although several embodiments have been described in detail for purposes of illustration, various modifications may be made without departing from the scope and spirit of the invention. Accordingly, the invention is not to be limited, except as by the appended claims.

What is claimed is:

1. A system for generating and storing clean energy, comprising:
    a flexible body externally exposed to an intermittent localized pressure;
    a first check valve coupled to the flexible body and configured to facilitate unidirectional fluid flow into the flexible body and a second check valve coupled to the flexible body and configured to facilitate unidirectional fluid flow out from the flexible body;
    a substantially rigid and planar base positioned adjacent the flexible body and opposite the intermittent localized pressure, the flexible body being of a shape and configuration to facilitate pressure point peristaltic expansion and compression cycles along a portion thereof responsive to the intermittent localized pressure to cause positive fluid displacement into and out from the flexible body through the first valve and the second valve, respectively; and
    an energy generation system in fluid communication with the flexible body configured to generate electrical energy from pressurized fluid resultant from the peristaltic expansion and compression cycles.

2. The clean energy system of claim 1, wherein the flexible body comprises a plurality of flexible tubes positioned substantially parallel to one another.

3. The clean energy system of claim 2, wherein the flexible tubes are individually exposed to the intermittent localized pressure.

4. The clean energy system of claim 2, including a turbine coupled to one or more of the flexible tubes.

5. The clean energy system of claim 2, including a manifold fluidly coupled to multiple flexible tubes for collectively receiving pressurized fluid.

6. The clean energy system of claim 5, wherein the second valve is disposed between one or more of the flexible tubes and the manifold.

7. The clean energy system of claim 5, including a pressure-activated motor coupled to the manifold, wherein the motor mechanically couples to an alternator to generate electricity.

8. The clean energy system of claim 1, including a tank coupled to the flexible body for storing pressurized fluid therein.

9. The clean energy system of claim 8, including a bladder in fluid communication with the flexible body and the tank to amplify compression of the pressurized fluid to the tank.

10. The clean energy system of claim 1, wherein the flexible body is disposed along a portion of a roadway and externally exposed to vehicular traffic.

11. The clean energy system of claim 1, wherein the flexible body and the planar base couple to a support mountable to an ocean floor or a bulkhead.

12. The clean energy system of claim 1, wherein the flexible body is disposed within a compressible panel.

13. The clean energy system of claim 12, wherein the compressible panel is configured to close along the longitudinal length of the flexible body in response to the intermittent localized pressure.

14. The clean energy system of claim 1, including multiple energy generation systems coupled in parallel or in series with one another.

15. The clean energy system of claim 1, wherein the flexible body comprises a shape-memory material.

16. The clean energy system of claim 1, wherein the intermittent localized pressure comprises wind pressure, wave pressure, earth pressure, or the weight of a vehicle.

* * * * *